United States Patent
Pendergrast et al.

(10) Patent No.: US 12,472,335 B2
(45) Date of Patent: Nov. 18, 2025

(54) REDUCTION OF BIOPARTICLE LEVELS OF AN ORGANISM

(71) Applicant: YMIR GENOMICS LLC, Cambridge, MA (US)

(72) Inventors: Patrick Shannon Pendergrast, Cambridge, MA (US); Robert Scott Pendergrast, Chatham, NJ (US); John Stephen Pendergrast, Stockholm, NJ (US); Anna Irmina Markowska, Brookline, MA (US)

(73) Assignee: YMIR GENOMICS LLC, Cambridge, MA (US)

( * ) Notice: Subject to any disclaimer, the term of this patent is extended or adjusted under 35 U.S.C. 154(b) by 1791 days.

(21) Appl. No.: 16/331,180

(22) PCT Filed: Sep. 8, 2017

(86) PCT No.: PCT/US2017/050645
§ 371 (c)(1),
(2) Date: Mar. 7, 2019

(87) PCT Pub. No.: WO2018/049136
PCT Pub. Date: Mar. 15, 2018

(65) Prior Publication Data
US 2019/0255303 A1 Aug. 22, 2019

Related U.S. Application Data

(60) Provisional application No. 62/385,632, filed on Sep. 9, 2016.

(51) Int. Cl.
*A61B 5/00* (2006.01)
*A61B 10/00* (2006.01)
(Continued)

(52) U.S. Cl.
CPC ....... *A61M 31/002* (2013.01); *A61B 10/0051* (2013.01); *A61F 5/453* (2013.01);
(Continued)

(58) Field of Classification Search
CPC ............ A61M 31/002; A61M 2202/20; A61M 2210/0625; A61M 2210/1085;
(Continued)

(56) References Cited

U.S. PATENT DOCUMENTS

| 5,137,031 A | 8/1992 | Guirguis |
| 2014/0038901 A1 | 2/2014 | Lyden et al. |

(Continued)

FOREIGN PATENT DOCUMENTS

WO   WO 2016022654 A1   2/2016

OTHER PUBLICATIONS

Notification of Transmittal of the International Search Report and the Written Opinion of the International Searching Authority, or the Declaration, Jan. 12, 2018, International Application No. PCT5/US2017/050645.

*Primary Examiner* — May A Abouelela
(74) *Attorney, Agent, or Firm* — Day Pitney LLP; Christopher R. Cowles

(57) ABSTRACT

Compositions and methods for the application of non-toxic bioparticle (e.g., extracellular vesicle (EV)) absorbing materials (e.g., non-toxic exosome reducing materials) for prophylactic, therapeutic, validation and/or experimental purposes are provided.

17 Claims, 29 Drawing Sheets

(51) Int. Cl.
    *A61F 5/453*     (2006.01)
    *A61J 1/05*     (2006.01)
    *A61M 31/00*     (2006.01)
    *B01D 15/34*     (2006.01)
    *C07K 1/20*     (2006.01)
    *G01N 1/40*     (2006.01)

(52) U.S. Cl.
CPC ............... *A61J 1/05* (2013.01); *B01D 15/34* (2013.01); *C07K 1/20* (2013.01); *G01N 1/405* (2013.01); *G01N 1/4077* (2013.01); *A61M 2202/20* (2013.01); *A61M 2210/0625* (2013.01); *A61M 2210/1085* (2013.01); *G01N 2001/4088* (2013.01)

(58) Field of Classification Search
CPC ........ A61B 10/0051; A61F 5/453; A61J 1/05; B01D 15/34; C07K 1/20; G01N 1/405; G01N 1/4077; G01N 2001/4088
See application file for complete search history.

(56) References Cited

U.S. PATENT DOCUMENTS

| | | | |
|---|---|---|---|
| 2014/0093880 A1* | 4/2014 | Kim ....................... | G01N 1/405 |
| | | | 435/6.12 |
| 2016/0216253 A1* | 7/2016 | Balaj ................... | G01N 33/566 |
| 2016/0223441 A1* | 8/2016 | Gjerde ................... | C12N 5/061 |
| 2017/0282154 A1* | 10/2017 | O'Halloran ........ | B01J 20/28085 |
| 2017/0315033 A1* | 11/2017 | Broyer .................. | C12N 13/00 |
| 2017/0340989 A1* | 11/2017 | Skudas ................ | B01D 15/265 |
| 2018/0195035 A1* | 7/2018 | Goddard ................ | C12M 47/02 |
| 2018/0266971 A1* | 9/2018 | Peaslee .............. | G01N 33/1826 |

* cited by examiner

DE PURIFICATION OF EXTRA-CELLULAR VESICLES FROM 3 mls OF URINE AND 5 mls OF SALIVA DIATOMACEOUS EARTH WRAPPED IN A POROUS CELLULOSE BAG AND PLACED
IN A HUMAN MOUTH ISOLATED EXTRA-CELLULAR VESICLE MARKER Rab5b

REDUCTION OF BIOPARTICLE LEVELS OF AN ORGANISM

CROSS-REFERENCE TO RELATED APPLICATION

This application is the U.S. national stage pursuant to 35 U.S.C. § 371, of United States International Patent Application Ser. No. PCT/US2017/050645, filed Sep. 8, 2017 and published in English on Mar. 15, 2018 as publication WO 2018/049136, which claims the benefit of priority under 35 U.S.C. § 119 (e) to U.S. Provisional Application No. 62/385,632, filed on Sep. 9, 2016, entitled, "Reduction of Bioparticle Levels of an Organism." The entire contents of these patent applications are hereby incorporated by reference herein.

FIELD OF THE INVENTION

The present invention relates to compositions and methods for the application of non-toxic bioparticle (e.g., extracellular vesicle (EV)) absorbing materials (e.g., non-toxic exosome reducing materials) for therapeutic, validation and/or experimental purposes. In addition, the invention relates to the field of cell biology, and in particular, to the study of circulating, cell-free, membrane-bound structures and protein-nucleic acid complexes that are produced and released by cells. The term "bioparticles" collectively describes these and other cell-free entities including proteins, non-vesicular lipids, DNA, RNA, and certain small molecules. The invention also relates to compositions and methods for the in vivo and in vitro absorption of bioparticles produced by cells, for therapeutic and target validation purposes. The invention also relates to a device that collects, removes cells and debris from, and stabilizes urine bioparticles for storage and/or transport. Such bioparticles produced by cells, are useful, for example, in diagnostic, prognostic, and therapeutic applications.

BACKGROUND OF THE INVENTION

A diverse collection of proteins, nucleic acids, protein-nucleic acid complexes and membrane-bound structures are released from cells, particularly mammalian cells, during the course of their life and death. Such compositions are broadly termed "bioparticles." Exemplary nucleic acids include both DNA (also called cell-free DNA (cfDNA), circulating tumor DNA (ctDNA) and/or circulating DNA) and RNA (including free RNA; RNA as a component of a protein complex, such as Ago2-microRNA complexes (Arroyo et al. *PNAS* 108: 5003-5008) or RNA within extra-cellular vesicles (such as exosomes, sometimes called exo-RNA)). Such complexes are released into the fluids of a subject (e.g., urine, blood, saliva, etc.) according to the status of the cell and/or upon degradation of the cell after death.

Membrane-bound structures (also known as "extracellular vesicles" or "EVs") released from or otherwise derived from cells include exosomes, microvesicles, apoptotic bodies, and high density lipoprotein (HDL)-particles. (It is noted that, as would be evident to the skilled artisan, compositions and methods of the invention recited as directed to, e.g., exosome sequestration/reduction/isolation, can also be applied to sequestration/reduction/isolation of other cell-derived membrane bound structures, e.g., extracellular vesicles, microvesicles, etc.)

The function of EVs is not clearly understood, although in certain capacities, they are believed to act as nano-shuttles for the transport and delivery of information from one location and/or cell type to distant locations and/or other cell types (Mathivanan and Simpson, *J. Proteomics* 73(10): 1907-1920 (2010)). Also, they are theorized to be involved in a wide variety of physiological processes, including cardiac disease, adaptive immune responses to pathogens, and in tumor biology. It has been suggested that microvesicles might function in tumor immune suppression, metastasis, and tumor-stroma interactions. Microvesicles are particularly thought to play a role in immune system cellular communication, for example, involving dendritic cells and B cells (Raposo et al., *J. Exp. Med.* 183: 1161 (1996)). Importantly, there is recent evidence that EVs released from tumor cells (also known as Tumor Derived Exosomes or TEXs) can promote tumor invasiveness and/or metastasis (Suchorska and Lach, *Oncol. Rep.* (2015) PMID: 26707854). For instance, exosomes released from bladder cancer cells can promote epithelial-to-mesenchymal transition in urothelial cells, setting the stage for bladder cancer invasiveness (Franzen et al., *Oncogenesis* 4: e163 (2015)).

One of the significant technical challenges in current microvesicle research relates to the problem of how to isolate microvesicles efficiently from their various sources. Current methodologies for isolating secreted microvesicles, including but not limited to exosomes, are constrained by technical limitations and other drawbacks. These known methodologies are labor intensive, time-consuming, costly, and can be unreliable for different fluids; see Tauro et al., "Comparison of ultracentrifugation, density gradient separation, and immunoaffinity capture methods for isolating human colon cancer cell line LIM1863-derived exosomes," *Methods* 56(2):293-304).

In particular, investigators and clinicians have previously possessed few choices for the selective, non-toxic "knock-out", elimination and/or amelioration of EVs in vitro (i.e., in cell culture) or in vivo (i.e., in animal models or human subjects in clinical trials). Such methods would enable pre-clinical validation of exosomal targets, discovery of disease biomarkers and possibly even provide for clinical therapeutic intervention of disease-altering exosomal effects. One previously available method for EV reduction has been to use antibodies specific for membrane proteins to sequester EVs. However, since many cells possess membrane proteins identical to those of EVs, it has been impossible to prevent such antibodies from affecting cells as well as exosomes. Furthermore, antibodies are expensive and possess limited capacity. A second available alternative has been to use Heparin to bind EVs (Franzen et al., *Oncogenesis.* 4: e163 (2015)). However, Heparin has a very limited half-life and would thus require constant dosing to maintain any manner of blockade/chronic depletion of EVs. Furthermore, Heparin is well known to affect cells and has been shown to possess significant side effects when used therapeutically in humans and animals (Smythe et al. "Guidance for the practical management of the heparin anticoagulants in the treatment of venous thromboembolism. *J. Thromb. Thrombolysis.* 41: 165 (2016); Gurbuz et al. "Heparin toxicity in cell culture: a critical link in translation of basic science to clinical practice," *Blood Coagul. Fibrinolysis.* 24: 742 (2013)).

Two significant technical challenges in current research in extra-cellular vesicles are the problem of how to minimize contamination of cellular macromolecules from the cell-free biofluid sample and how to minimize the degradation of extra-cellular vesicle constituents during transport or storage. Typically, once the sample arrives in the research or clinical laboratory the cells are removed from the sample with a low speed centrifugation spin (<10,000×g). The cell-free sample is then either immediately processed or it is frozen to preserve the bioparticles until they can be isolated.

This routine is adequate for samples acquired from patients located within or near the research laboratory; but for patients donating samples from home or from a distant point-of-care location, the biofluid sample is subjected to a days-to-weeks time period for transport or storage before the research laboratory can process it. Simply freezing the sample prior to removing the cells is not sufficient to ameliorate this problem, as it is well known that freeze-thaw cycles can actually lyse cells in fluids thus exacerbating the problem. Furthermore, shipping a frozen sample increases the cost of sample collection and is not always possible for samples being sent from the developing world—where the cold-chain cannot always be maintained.

This issue is especially problematic for urine samples. Urine is a relatively variable biofluid, with significant sample-to-sample variation in pH (from pH 4-to pH 8), cell content, and salt concentration. Furthermore, samples can be extremely dilute or extremely concentrated. Such extremes promote the lysis of cells contained in the fluid. thine has the advantage over many biofluids such as blood or cerebral spinal fluid in that it can be acquired non-invasively away from a clinic or hospital. This advantage is lost if, during the act of transporting the sample to the research laboratory, cell lysis contaminates the cell-free fraction of the sample. Thus, it is needed in the art to have a urine sample collection device that would 1) immediately remove cells from the sample and 2) immediately expose bioparticles in the cell-free biofluid to a stabilization agent such as Diatomaceous Earth (see e.g., PCT/US2015/043768).

SUMMARY OF THE INVENTION

The current invention is based, at least in part, upon the discovery of non-toxic compositions, methods, and devices that allow for targeted (apparently based upon size-selection) sequestration and/or reduction of extracellular vesicles and/or circulating bioparticles in a subject that may be collected, stored, and/or transported, which further allow for retrieval of EV and/or circulating bioparticle constituents such as protein, RNA, DNA and/or lipids, for therapeutic or diagnostic purposes, or for further study.

The invention is based, at least in part, upon identification of a means for isolating bioparticles from liquid samples (e.g., biofluid) using an apparent matrix-binding method (without wishing to be bound by theory, the matrix-binding method appears to exploit pore sizes of certain materials to effect enrichment, such as the pore sizes found in porous beads, e.g., siliceous beads such as diatomaceous earth and perlite). Diatomaceous earth (DE) is a non-toxic, non-digestible siliceous particle that has been used as an additive in livestock feed for many years. In certain aspects, the invention provides methods for the rapid and inexpensive isolation of bioparticles, such as: membrane-bound vesicles, cell-free protein-nucleic acid complexes, cell-free mRNA, and/or cell-free DNA, which can be isolated from almost any fluid, including in vitro cell culture and in vivo fluids/mucosal layers of animals, including humans.

The methods of the invention can be employed using common laboratory equipment and reagents. They do not require high-speed centrifugation, such as ultracentrifugation. They do not require expensive membranes, antibodies, antibody fragments, beads, or sophisticated columns.

The current compositions and methods are provided as therapeutics and diagnostics, for administration to and/or contact with a subject. One contemplated effect of the administration/contact methods of the invention is to enable researchers to determine the in vitro/in vivo effects of EVs on cellular processes, including disease. The current methods and compositions are also contemplated as useful for prophylaxis and/or treatment of disease in cases where the sequestration of EVs/disruption of bioparticle/EV signaling would be expected to provide prophylactic and/or therapeutic benefit (one such exemplary disease is cancer, as detailed further elsewhere herein).

The instant methods are not only directed to sequestration/reduction of EV and/or bioparticle levels in urine, but can also be used upon any biofluid, such as, but not limited to, blood plasma, blood serum, cerebrospinal fluid (CSF), saliva, synovial fluid, amniotic fluid, and cell culture media. Microvesicles isolated by the methods of the invention possess characteristics of true microvesicles, as assayed by protein markers and small RNAs.

In one aspect, the invention provides a composition for contacting a bioparticle-containing biofluid of an organism that includes a container or device containing porous beads possessing a pore size capable of sequestering the bioparticle of the biofluid upon contact with the bioparticle-containing biofluid.

In one embodiment, the bioparticle of the biofluid promotes a disease or disorder, optionally the disease or disorder is cancer. In related embodiments, the cancer is a bladder or an oral cancer.

In certain embodiments, the container or device is a pouch, optionally a pouch possessing a porous membrane and/or porous cellulose as an outer layer, optionally a cellulose bag or sac.

In some embodiments, the porous beads are non-toxic, and optionally the porous beads are siliceous beads, optionally diatomaceous earth (DE).

Another aspect of the invention provides a method for reducing the level of a bioparticle in a biofluid of an organism, the method involving contacting the biofluid of the organism with a composition of the invention for a time sufficient to reduce the level of the bioparticle in the biofluid of the organism, thereby reducing the level of the bioparticle in the biofluid of the organism.

An additional aspect of the invention provides a method for sequestering and detecting a released bioparticle from cell culture media in vitro, involving i) applying porous beads to the cell culture media; ii) incubating the bead-containing media with cells under conditions appropriate for sequestration of the released bioparticle in the porous beads; iii) isolating the porous beads; and iv) detecting bioparticles sequestered by the porous beads, thereby sequestering and detecting the released bioparticle from cell culture media in vitro.

In one embodiment, the method further involves v) assaying the cells to determine an effect of the applied porous beads.

In certain embodiments, the isolating step in involves low speed centrifugation.

In some embodiments, the bioparticle is sequestered into a container or device, optionally a pouch, which is optionally placed in the vicinity of the bioparticle-generating cells.

In certain embodiments, the container or device contains a porous bead resin surrounded by a membrane (optionally, cellulose) or housing that allows bioparticles to flow into the container or device to be sequestered/captured but optionally does not allow for direct contact between the resin and surrounding cells.

An additional aspect of the invention provides a method for treating or preventing cancer in an organ of a subject having or at risk of developing cancer that involves contacting a biofluid of the subject with a composition of the invention for a time sufficient to reduce the level of the bioparticle in the biofluid of the subject, thereby treating or preventing cancer in the organ of the subject having or at risk of developing cancer.

In certain embodiments, the composition of the invention includes siliceous beads, optionally DE, optionally within a device or container, optionally a device or container bounded by a porous membrane and/or porous cellulose, optionally the device or container is placed within the urinary bladder of a subject, optionally in proximity of a bladder cancer tumor and/or in proximity to a site susceptible to bladder cancer formation.

In some embodiments, a composition of the invention is placed within the urinary bladder of a subject, optionally in proximity of a bladder cancer tumor and/or in proximity to a site susceptible to bladder cancer formation, optionally for a length of time selected from the group consisting of 10 minutes to 30 minutes, 15 minutes to an hour, 30 minutes to 2 hours, 1-3 hours, 2-4 hours, 3-10 hours, 5-24 hours, 1-2 days, 2-4 days, 3 days to a week, one to three weeks, 2-4 weeks, 2 weeks to 2 months, one month to four months, two months to six months, three months to a year, and six months to two years or more.

Another aspect of the invention provides a method for sequestering released bioparticles in the saliva of a subject, involving i) contacting a container or device containing porous beads contained within a porous membrane and/or porous cellulose with the mouth of the subject under conditions that allow for sequestration of saliva bioparticles; ii) removing the container or device from the mouth of the subject; iii) optionally removing the porous beads from the container or device; iv) releasing bioparticles from the porous beads, optionally by contacting the porous beads with a chaotropic agent or a detergent; and v) optionally assaying the released bioparticles, optionally using one or more of SDS PAGE/immunoblot, PCR and/or mass spectrometry.

Another aspect of the invention provides a method for disrupting bioparticle-mediated signaling in a biofluid of an organism, the method involving contacting the biofluid of the organism with a porous container or device containing porous beads that possess a pore size capable of sequestering the bioparticle that is performing bioparticle-mediated signaling, for a time sufficient to reduce the level of the bioparticle in the biofluid of the organism, thereby disrupting bioparticle-mediated signaling in the biofluid of the organism.

In another aspect, the current invention may include a device with at least two components such as, for example, an at-home or point-of-care urine sample collection component that quickly removes cells from a urine sample and a transport and/or storage component that stabilizes the cell-free urine sample using a secreted bioparticle binding matrix. Together these components may constitute a device that provides methods for the generation of a cell-free bioparticle-rich urine sample suitable for basic and clinical research. Study of secreted bioparticles present in such samples will yield data sets containing lower background signal then the study of samples that were stored and transported by current sample collection devices.

In certain embodiments, the invention provides methods for removing cells contained in a urine sample by driving the sample through a filter with sufficiently small pore size to trap mammalian cells but sufficiently large pore size to allow for the passage of secreted bioparticles (i.e. from 0.2 microns to 6 microns). This filter partitions a collection tube (where the sample is first deposited by the patient) and a transport/storage container In certain embodiments, the invention provides methods for pushing the sample through the filter by using a screw cap for the collection tube to be applied after collection of the sample.

In certain other embodiments, the invention provides methods for pushing the sample through the filter by using a plunger-cap for the collection tube to be applied after collection of the sample.

In certain other embodiments, the invention provides methods for pulling the sample through the filter by using a plunger inserted fully into the storage container prior to collection of the sample, to be applied after collection of the sample.

In certain other embodiments, the invention provides methods for pulling the sample through the filter by using a vacuum established at manufacture, to be applied after collection of the sample by the perforation of membrane separating the vacuum from the collection container via screw cap containing teeth.

In certain other embodiments, the invention provides methods for preventing the re-contacting of the cell-free urine sample present in the storage chamber with the membrane, which may have cells adhered to one side. In this embodiment, a screw plunger forces the specimen through the filter, and a magnet is used to pull a ball stop into position at the end of the process in order to seal off the specimen from the filter.

In an exemplary embodiment, the device may be used as follows:
 1. The patient urinates into the specimen collection area (onto the filter in effect);
 2. The patient slowly screws the plunger top into the specimen area over a period of 15 to 20 seconds, which forces the liquid specimen through the filter. At the end of this process, a magnet disposed at the bottom of the screw plunger comes close enough to a ferrous ball stop in order to move it into position to seal off the filtered specimen from the filter. The patient is instructed to keep screwing down the screw plunger until the ball rises into position.
 3. The patient screws on the lid of the container.

In certain embodiments, the invention provides methods for facilitating the passage of the sample through the filter by applying a reducing agent to the sample and/or the filter. Not being bound by theory, a reducing agent applied to the sample/filter may prevent the aggregation of Tamm-Horsfall Protein (THP), a known constituent of mammalian urine that contains a large number of thiol groups that can cause aggregation. Such aggregation can block a filter, reducing flow rate and increasing the force necessary to drive the sample through the filter and into the storage compartment.

In certain embodiments, the reducing agent is TCEP.

In some embodiments of the invention, another reducing agent other than TCEP can be used, such as DTT.

In certain embodiments, the invention provides methods for stabilizing bioparticles by the inclusion of diatomaceous earth in the storage compartment. Not being bound by theory, the diatomaceous earth binds bioparticles removing them from the soluble fraction of the sample, thereby protecting them from enzymes such as nucleases or proteases that may degrade their constituents.

In some embodiments of the invention, another stabilizing agent other than diatomaceous earth may be used. For instance, the inclusion of a uric acid salt such as Na Urate in the storage container under certain conditions may induce the precipitation of biofluids from urine removing them from the soluble fraction and protecting them from degradation. For example, Polyethylene Glycol may also be used in this manner.

In some embodiments of the invention, a port in the second chamber (the storage chamber) may be used to allow easy drainage by the laboratory performing the analysis.

In certain embodiments, the secreted bioparticles that are sequestered/reduced are exosomes. In some embodiments, sequestration/reduction of exosomes is confirmed by determining whether or not sequestered material is enriched for protein and/or nucleic acid makers that are known to preferentially segregate with exosomes. In related embodiments, reduction in protein and/or nucleic acid markers within contacted biofluids post-administration/contact, relative to before administration/contact and/or other appropriate control or level/value, indicates sequestration/reduction of exosomes and/or bioparticles.

In some embodiments, the sequestered/reduced bioparticles are protein-nucleic acid complexes such as AGO2-miRNA particles. Evidence for these particles (or for the reduction/absence of such particles) can be obtained by assaying for specific miRNAs known to take part in an AGO2-miRNA particle/complex or by assaying for AGO2 protein.

In certain embodiments, the sequestered/reduced bioparticles are cell-free nucleic acid particles.

In some embodiments, the invention provides methods for sequestering released bioparticles from cell culture media during the course of an in vitro cell culture experiment, where those methods comprise: i) applying non-toxic porous beads (e.g., siliceous beads such as diatomaceous earth (DE)) to the active cell culture; ii) incubating the bead-containing media with cells for some time, at temperature and atmospheric settings appropriate for the experiment; iii) removing the media and isolating the beads via low speed centrifugation; iv) assaying the bioparticles bound to the isolated beads; and vi) assaying the cells to determine the effects of the added beads.

In certain embodiments, the secreted bioparticles are sequestered into a device (e.g., a pouch), which is optionally placed in the vicinity of the bioparticle-generating cells, either in vitro or in vivo.

In some embodiments, the device contains a resin that captures bioparticles surrounded by a membrane (optionally, a cellulose bag or sac) housing that allows bioparticles to flow into the device to be captured by the resin but optionally does not allow for direct contact of the resin with cells. Optionally, the device also allows for the relatively easy recovery of the bioparticle-containing resin.

In certain embodiments, the resin consists of a non-toxic porous bead, such as siliceous beads, optionally diatomaceous earth.

In certain embodiments, the invention provides methods for sequestering disease-promoting bioparticles in vivo, for research and/or therapeutic purposes.

In certain embodiments, the invention provides methods for the therapeutic sequestration of released bioparticles from cancer cells by placing a composition containing siliceous beads (e.g., diatomaceous earth), optionally within a device or container, optionally one bound by a casing (e.g., a porous membrane and/or porous cellulose) in the proximity of a cancerous tumor or a site susceptible to formation of a cancerous tumor, for some time. Optionally, the duration of time for such placement is 10 minutes to 30 minutes, 15 minutes to an hour, 30 minutes to 2 hours, 1-3 hours, 2-4 hours, 3-10 hours, 5-24 hours, 1-2 days, 2-4 days, 3 days to a week, one to three weeks, 2-4 weeks, 2 weeks to 2 months, one month to four months, two months to six months, three months to a year, or six months to two years or more.

In certain embodiments, the invention provides a method for the therapeutic sequestration of released bioparticles from bladder cancer cells by placing a composition containing siliceous beads (e.g., diatomaceous earth), optionally within a device or container, optionally one bound by a porous membrane and/or porous cellulose, within the bladder of a subject, in proximity of a bladder cancer tumor and/or in proximity to a site susceptible to bladder cancer formation, for some time. In certain embodiments, the duration of time for such placement is 10 minutes to 30 minutes, 15 minutes to an hour, 30 minutes to 2 hours, 1-3 hours, 2-4 hours, 3-10 hours, 5-24 hours, 1-2 days, 2-4 days, 3 days to a week, one to three weeks, 2-4 weeks, 2 weeks to 2 months, one month to four months, two months to six months, three months to a year, or six months to two years or more.

In some embodiments, the invention provides methods for the sequestration of released bioparticles from saliva by i) placing a composition containing siliceous beads (e.g., diatomaceous earth), optionally within a device or container, optionally a container or device bound by a porous membrane and/or porous cellulose, within the mouth of an animal or human for some time; ii) removing the device from the mouth; iii) removing the siliceous beads (e.g., DE) from the device; iv) releasing the bioparticles and/or components of the bioparticles from the treated siliceous beads (e.g., DE) with an agent (e.g., a chaotropic agent) or detergent capable of disrupting association of the siliceous beads (e.g., DE) with the bioparticles; and v) assaying the bioparticles and/or components of the bioparticles using a diagnostic method to identify bioparticles and/or bioparticle components (e.g. SDS PAGE/immunoblot, PCR, mass spectrometry, etc., including combinations thereof).

The current invention provides advantages over antibody-based methods of bioparticle/EV sequestration and/or reduction, at least because it is low cost, capable of functioning in harsh environments including urine and saliva, distinguishes cells from bioparticles, and has higher capacity/is scalable/amenable to higher throughput. The current invention also provides advantages over heparin, at least because it induces fewer side effects and is less toxic. Advantages of the current method over existing methods for the isolation of bioparticles from saliva include not requiting repeated expectoration (ability to isolate bioparticles from small sample volumes) and not requiring a separate step to separate mucous and cells from bioparticle-containing fluids, among other advantages that will be apparent to the skilled artisan.

The invention is superior to existing commercial and academic sample collection methods because known biomarkers for bioparticles are resistant to degradation and more efficiently isolated.

Definitions

As used herein, the term "bioparticle" refers to cell-free, membraned structures secreted from mammalian cells such as, but not limited to, microvesicles, exosomes, apoptotic bodies, LDL-particles etc., plus cell-free, relatively stable, protein-nucleic complexes secreted from mammalian cells such as but not limited to microRNA-AGO2 complexes, plus cell-free DNA (cfDNA) and cell-free messenger RNA. Thus, certain exemplary bioparticles include cell free miRNA, proteins, lipids, glycoproteins, DNA, mRNA, tRNA, other types of RNA, etc., which can exist relatively stably outside of cells, in various forms, including but not limited to: protein-nucleic acid complexes, exosomes, microvesicles, LDL particles, and apoptotic bodies.

As used herein, the term "microvesicle" refers generally to any plasma membrane bound particle that may reside within the cell, or in the extracellular environment. These structures are not limited in any way with regard to in vivo localization (e.g., intracellular or extracellular), in a body fluid, in a cell culture media, generated by in vitro cultured cells, mechanism of origin or size characteristics. In some embodiments, a microvesicle can range in size with a lower size limit of at least about 20 nanometers (nm) in diameter, or alternatively, 30 nm, or 40 nm, or 50 nm in diameter. In some embodiments, a microvesicle has an upper size limit of not more than about 1,000 nm (i.e., 1.0 micrometer, micron, or µ), alternatively, not more than about 1,500 nm, about 2,000 nm or about 2,500 nm. As used herein, the term "secreted microvesicle" is used synonymously with "circulating microvesicle (cMV)" or "extracellular microvesicle (emV)" or "extracellular vesicle (eV)" and refers to a subset of microvesicles that are found in an extracellular space under normal physiological conditions. As used herein, it is not intended that the term "circulating microvesicles" be limited to microvesicles of any particular size or size range, or any particular production mechanism. For example, but not limited to, a cMV of the invention can be produced by (i) exocytosis from multivesicular bodies to produce exosomes, (ii) budding, fission and shedding of microvesicles directly from a cytoplasmic membrane, and (iii) membranous blebs caused by programmed cell death leading to the formation of apoptotic bodies. As used herein, the term "cMV" is not limited to microvesicles of any particular size or size range.

As used herein, the term "shedding microvesicle (SMV)" refers to a class of microvesicles that are produced by cells using a mechanism of direct plasma membrane budding, fission and shedding to produce microvesicles that are released by a cell into an extracellular environment. As used herein, it is not intended that an SW of the invention be limited by any particular size or size range.

As used herein, the term "exosome" refers to a subset of circulating microvesicles that are preformed microvesicles that are released from the cell following the exocytic fusion of intracellular multivesicular bodies with the plasma membrane, i.e., exosomes have an endocytic origin. As used herein, it is not intended that an exosome of the invention be limited by any particular size or size range.

As used herein, the term "organism" refers to an animal, plant or single-celled life form. The term "organism" is also contemplated to encompass any alien/extraterrestrial life form(s) that might be identified.

The term "subject" includes human and non-human animals. Non-human animals include all vertebrates, e.g., mammals and non-mammals, such as non-human primates, sheep, dog, cow, chickens, fish, amphibians, and reptiles, and also includes non-vertebrates (e.g., insects, worms, etc.). Except when noted, the terms "patient" or "subject" are used herein interchangeably.

As used in this application, the term "cells" encompasses not only eukaryotic cells, e.g., avian, reptilian, higher eukaryotic cells such as mammalian cells, as in human cells or mouse cells, but also prokaryotic cells, such as eubacteria cells and Archaea cells.

The term "treating" includes the administration of compositions to prevent or delay the onset of the symptoms, complications, or biochemical indicia of a disease (e.g., cancer, including, e.g., tumor formation, growth and/or metastasis), alleviating the symptoms or arresting or inhibiting further development of the disease, condition, or disorder. Treatment may be prophylactic (to prevent or delay the onset of the disease, or to prevent the manifestation of clinical or subclinical symptoms thereof) or therapeutic suppression or alleviation of symptoms after the manifestation of the disease.

By "ameliorate" is meant decrease, suppress, attenuate, diminish, arrest, or stabilize the development or progression of a disease.

As used herein, the terms "prevent," "preventing," "prevention," "prophylactic treatment" and the like refer to reducing the probability of developing a disorder or condition in a subject, who does not have, but is at risk of or susceptible to developing a disorder or condition.

By "reference" is meant a standard or control, e.g., a standard or control condition.

Cancer, as used herein, can include the following types of cancer: breast cancer; biliary tract cancer; bladder cancer; brain cancer including glioblastomas and medulloblastomas; cervical cancer; choriocarcinoma; colon cancer; endometrial cancer; esophageal cancer; gastric cancer; hematological neoplasms including acute lymphocytic and myelogenous leukemia; T-cell acute lymphoblastic leukemia/lymphoma; hairy cell leukemia; chronic myelogenous leukemia, multiple myeloma; AIDS-associated leukemias and adult T-cell leukemia lymphoma; intraepithelial neoplasms including Bowen's disease and Paget's disease; liver cancer; lung cancer; lymphomas including Hodgkin's disease and lymphocytic lymphomas; neuroblastomas; oral cancer including squamous cell carcinoma; ovarian cancer including those arising from epithelial cells, stromal cells, germ cells and mesenchymal cells; pancreatic cancer; prostate cancer; rectal cancer; sarcomas including lei omyosarcoma, rhabdomyosarcoma, liposarcoma, fibrosarcoma, and osteosarcoma; skin cancer including melanoma, Kaposi's sarcoma, basocellular cancer, and squamous cell cancer; testicular cancer including germinal tumors such as seminoma, non-seminoma (teratomas, choriocarcinomas), stromal tumors, and germ cell tumors; thyroid cancer including thyroid adenocarcinoma and medullar carcinoma; and renal cancer including adenocarcinoma and Wilms tumor. Other cancers will be known to one of ordinary skill in the art.

The terms "tumor," "solid tumor," "primary tumor," and "secondary tumor" refer to carcinomas, sarcomas, adenomas, and cancers of neuronal origin and, in fact, to any type of cancer which does not originate from the hematopoietic cells and in particular concerns: carcinoma, sarcoma, adenoma, hepatocellular carcinoma, hepatocellular carcinoma, hepatoblastoma, rhabdornyosarcoma, esophageal carcinoma, thyroid carcinoma, ganglioblastoma, fibrosarcoma, myxosarcoma, liposarcoma, chondrosarcoma, osteogenic sarcoma, chordoma, angiosarcoma, endotheliosarcoma, lymphangiosarcoma, synovioma, Ewing's tumor, leiomyosarcoma, rhabdotheliosarcoma, colon carcinoma, pancreatic cancer, breast cancer, ovarian cancer, prostate cancer, squamous cell carcinoma, basal cell carcinoma, adenocarcinoma, renal cell carcinoma, hematoma, bile duct carcinoma, melanoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, retinoblastoma, multiple myeloma, rectal carcinoma, thyroid cancer, head and neck cancer, brain cancer, cancer of the peripheral nervous system, cancer of the central nervous system, neuroblastoma, cancer of the endometrium, as well as metastasis of all the above.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Any compositions or methods provided herein can be combined with one or more of any of the other compositions and methods provided herein.

By "effective amount" is meant the amount of an agent required to ameliorate the symptoms of a disease relative to an untreated patient. The effective amount of active agent(s) used to practice the present invention for therapeutic treatment of a disease varies depending upon the manner of administration, the age, body weight, and general health of the subject. Ultimately, the attending physician or veterinarian will decide the appropriate amount and dosage regimen. Such amount is referred to as an "effective" amount.

Unless specifically stated or obvious from context, as used herein, the term "or" is understood to be inclusive. Unless specifically stated or obvious from context, as used herein, the terms "a," "an," and "the" are understood to be singular or plural.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

By "reduces" is meant a negative alteration of at least 10%, 25%, 50%, 75%, or 100%.

A "therapeutically effective amount" is an amount sufficient to effect beneficial or desired results, including clinical results. An effective amount can be administered in one or more administrations.

Although mechanistic theories for the endogenous production of circulating microvesicles are found in the scientific literature, any knowledge of such mechanisms is not required to make or used the present invention. It is not intended that the term "circulating microvesicles" as used herein be limited in any way with regard to the mechanism of their in vivo production.

As used herein, the term "apoptotic body" refers to a subset of circulating microvesicles that are produced as a result of apoptotic cell destruction. As used herein, it is not intended that an apoptotic body of the invention be limited by any particular size or size range.

As used herein, the term "isolating," or "to isolate," refers to any artificial (i.e., not naturally occurring) process for treating a starting material, where the process results in a more useful form of a molecule or structure of interest that is in the starting material. The "more useful form" of the molecule or structure of interest can be characterized in a variety of ways, no one of which is limiting. For example, as used herein, the invention provides methods for isolating secreted microvesicles from conditioned cell culture media. Further, for example, the process for isolating can result in:
  (i) the molecule of interest having a greater concentration in the isolated form compared to the starting material (e.g., concentrating),
  (ii) the removal of any amount or any type of impurities from the starting material (e.g., purifying),
  (iii) an increase in the ratio of the amount of molecule of interest to the amount of any undesired component in the starting material (e.g., enriching),
  (iv) any artificial process for removing a molecule or structure of interest from its natural source or location;
  (v) any artificial process for separating a molecule or structure of interest from at least one other component with which it is normally associated (e.g., purifying), or
  (vi) any combination of (i), (ii), (iii), (iv) or (v).

Similarly, as used herein, the term "isolated" generally refers to the state of the molecule or structure of interest after the starting material has been subjected to a method for isolating the molecule of interest. That is to say, isolating a molecule of interest from a starting material will produce an isolated molecule. For example, the methods of the invention can be used to produce preparations of isolated microvesicles (optionally sequestered from biofluid(s) of a subject). These preparations of microvesicles have been isolated from their natural source, for example, from urine, mucous, etc., or from conditioned cell culture media.

As used herein, the term "purifying" or "to purify" a molecule or structure of interest refers to a process for removing at least one impurity or contaminant from a starting material. For example, purifying a molecule of interest from a starting material refers to a process for removing at least one impurity from the starting material to produce a relatively more pure form of the molecule of interest.

As used herein, the term "substantially purified" refers to molecules or structures of interest that are removed from their natural environment or from a starting material (i.e., they are isolated) and where they are largely free from other components with which they are naturally associated or substantially free of other components that may render future use or study sub-optimal, difficult or impossible.

As used herein, the terms "purified" or "partially purified" refers to molecules or structures of interest that are removed from either (1) their natural environment, or from (2) a starting material they are isolated), and where (a) at least one impurity from the starting material has been removed, or (b) at least one component with which the molecule is naturally associated has been removed. A "purified" or "partially purified" molecule may still contain additional components that may render fixture use or study of the molecule sub-optimal, difficult or impossible.

As used herein, the term "enriching" (and "enriched" and the like) refers to a process whereby a molecule of interest that is in a mixture has an increased ratio of the amount of that molecule to the amount of other undesired components in that mixture after the enriching process as compared to before the enriching process.

As used herein, the term "concentrating" refers to a process whereby a molecule of interest that is in a mixture that has been subjected to that process has a greater concentration after the process as compared to the concentration of the molecule in the mixture before the process.

As used herein, the term "depleted" refers to a mixture containing an undesirable component, where that undesirable component has been (i) completely removed from the mixture, (ii) sufficiently removed from the mixture to be undetectable, or (iii) partially removed from the mixture such that its concentration in the mixture is significantly reduced. For example, a blood serum that has been depleted of endogenous microvesicles may contain no microvesicles, or may contain no detectable microvesicles, or may contain a reduced level of microvesicles compared to the untreated serum.

As used herein, the expression "cell culture media" refers to any growth media that can support in vitro cell growth of a designated cell line. Such media can be supplemented or non-supplemented, for example, with 10% by volume, heat-inactivated fetal calf serum.

As used herein, the expression "minimal defined cell culture media" or "minimal media" refers to any culture media where each component is defined by name and the concentration of each component is known. Minimal defined cell culture media generally does not contain a serum supplement. For example, Dulbecco's Modified Eagle's medium (DMEM) is a defined minimal cell culture media. Minimal defined cell culture media generally can be used to culture cells in vitro, but not for extended periods of time.

As used herein, the expression "complete cell culture media" refers to a culture media that comprises a defined minimal cell culture media, and in addition, also comprises a complex supplement that enhances the growth properties of the culture media. For example, a blood serum supplement is commonly added to a minimal media to produce a complete cell culture media. Fetal calf serum (FBS or FCS) is a common supplement (10% by volume) that is added to a minimal media to produce a complete culture media. Complete culture media are used to culture cells in vitro for indefinite (long) periods of time.

As used herein, the expression "conditioned cell culture media" refers to any cell culture media (including complete media or minimal media) that has been exposed to live cells in culture. Conditioned cell culture media comprises not only the defined components of the minimal media and the serum supplement, but also contains additional components that the living cultured cells have produced. In many cases, conditioned cell culture media is a serum-free media.

BRIEF DESCRIPTION OF THE DRAWINGS

FIG. 10A depicts the empty collection device; FIG. 10B illustrates the first step of the creation of the stabilized, cell-free, sample: deposition of the urine sample within the collection chamber; and FIG. 10C illustrates the second step; application of the screw cap plunger to force the solution through the membrane.

FIG. 18B shows that the vacuum force may be released by puncturing a membrane (blue line) with a spike (green). FIG. 18C shows the spike pushed into the vacuum membrane by releasing a collar (yellow) after the sample (purple) is placed in the collection chamber.

FIG. 19A depicts the embodiment of the collection device in which Red: Filter, Purple: area for specimen, blue lines represent threads. The screw plunger threads into the specimen area to force the sample down through the filter. Green: magnet, Orange: Ferrous ball which will be used to stop backflow through the filter during shipping. Black: Cage and supporting structure for ball stop. Note that the part that hangs down and encloses the ball is a mesh or cage structure which allows liquid to flow through and around the ball. But when the ball is up at the top, it stops up the hole near the filter and prevents flow. There is a rubber seal (not shown) around the hole that the ball is drawn up to by the magnet. FIG. 19B shows the state of the system after the sample is in the specimen collection area. The screw plunger has been partially screwed into the specimen area, forcing some of the sample through the filter in this figure. The burnt orange color represents the sample. The patient is instructed to fully tighten the screw cap once the sample stops dripping into the bottom portion of the container. FIG. 19C shows that when the patient has completed screwing down the screw plunger, the magnet at the bottom of the screw plunger is in close enough proximity to attract the ferrous ball. This pulls the ball upward so that it engages with the hole at the top of the ball stop cage. There is a rubber lip around this hole (not shown) to affect a liquid tight seal. This is important because the cells and other debris trapped in the filter will break down over time, releasing tiny particles which may be able to get through the filter. The ferrous ball plugs the hole between the filter and the filtered sample specimen, preventing these undesirable breakdown products from contaminating the filtered sample specimen. FIG. 19D shows that once the process is complete, the patient simply screws on the screw cap, creating an additional seal for safety during shipping/storage. FIG. 19E shows a prototype device, highlighted is the housing for the magnetic ball stop.

FIG. 20A depicts how the parts are arranged when a sample is ready to be put into the collection area. Red: Filter. Purple: area for specimen. Blue lines represent threads. The screw plunger threads into the specimen area to force the sample down through the filter. Green: flexible membrane, such as rubber, is in the center of the filter. Orange: Ferrous ball which will be used to stop backflow through the filter during shipping. Black (below filter): a rigid shelf structure with a hole only in the center. The protrusion at the bottom of the filter will plug this hole at the very end of its travel. There is a bit of space between the filter and the rigid shelf, so that liquid that has gone through the filter can easily flow toward the hole. The shelf could also be angled conically toward the hole to aid flow. FIG. 20B depicts the state of the system after the sample is in the specimen collection area. The screw plunger has been partially screwed into the specimen area, forcing some of the sample through the filter in this figure. The burnt orange color represents the sample. The patient is instructed to fully tighten the screw cap once the sample stops chipping into the bottom portion of the container. FIG. 20C shows that when the patient has completed screwing down the screw plunger, the protrusion on the bottom of the plunger has stretched the flexible membrane and caused it to plug the hole in the center of the shelf. There is a rubber lip around this hole (not shown) to affect a liquid tight seal. The protrusion plugs the hole between the filter and the filtered sample specimen, preventing these undesirable breakdown products from contaminating the filtered sample specimen. FIG. 20D shows the device once the sample has traversed completely into the collection chamber and the final screw cap has been applied. This configuration is ready for shipment.

FIG. 21A shows the exemplary collection chamber in an empty configuration. Screw-cap: solid blue cylinder at top. Collection and storage chamber: translucent blue cylinder. Stabilization matrix (i.e. diatomaceous earth (DE)): small blue circles. Fine Pore Bag: Orange rectangle. FIG. 21B shows the collection device with sample (yellow cylinder) and screw cap tube applied and ready for shipment/storage.

DETAILED DESCRIPTION OF THE INVENTION

Figure 1:
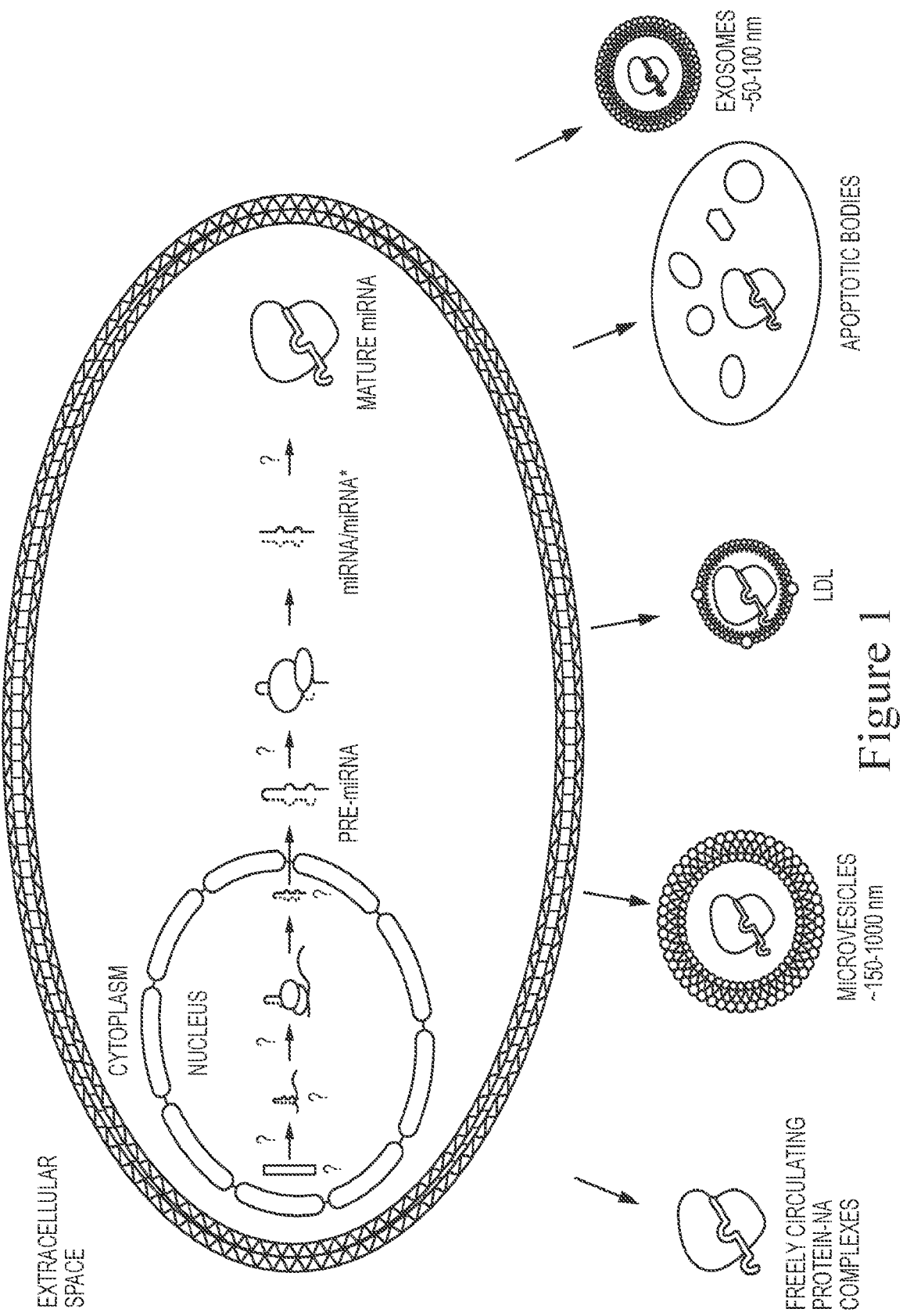
FIG. 1 shows an exemplary range of biomarkers that are secreted from cells, such as miRNA (depicted), proteins, lipids, glycoproteins, DNA, mRNA, tRNA, etc., which can exist in relatively stable form outside of cells, including but not limited to the following forms: protein-nucleic acid complexes, exosomes, microvesicles, LDL particles, and apoptotic bodies.

The present invention provides compositions and methods for sequestering and/or reducing bioparticles (including, e.g., secreted microvesicles and/or extracellular vesicles (EVs), RNA, DNA and protein-nucleic acid complexes) by contacting a biofluid with a composition that includes porous beads. Additionally, the present invention provides compositions and methods for producing a urine sample that is cell-free and contains stabilized secreted microvesicles, RNA, DNA and protein-nucleic acid complexes (collectively called "bioparticles") from a liquid sample.

In certain aspects, the instant invention specifically provides therapeutic methods for the sequestration and/or reduction of bioparticles upon contacting porous beads with a biofluid of an organism or subject. In certain embodiments, implantable, porous pouches and/or devices containing porous beads (e.g., diatomaceous earth and/or perlite) are contacted with a biofluid of a subject, e.g., via implantation within a bladder or other organ of a subject, thereby disrupting bioparticle and/or exosome-mediated signaling, to therapeutic end, optionally allowing for isolation of such bioparticles from the implantable composition/device. In other embodiments, a composition of the invention is contacted with a mucous membrane of a subject, thereby causing sequestration and/or reduction of bioparticles within contacted mucus and/or saliva of the subject, optionally with therapeutic effect.

Specific diseases or disorders contemplated for treatment using the compositions of the invention include hyperproliferative diseases (e.g., cancer), although the methods and compositions of the invention can be applied to any disease or disorder that is modulated (e.g., upregulated) via bioparticle signaling. Kits, devices and/or pouches used to contact a subject with porous beads of the invention, as well as instructions for their use, are also provided.

Microvesicles

The term "microvesicles" (also known as microparticles) refers to a heterogeneous in vivo collection of membrane bound (i.e., encapsulated) biological structures. These structures are formed from lipid bilayer, which is the same lipid bilayer that comprises eukaryotic cell membranes. Microvesicles can reside within the cell, or in the extracellular environment. Microvesicle structures (intracellular and/or extracellular) are produced by nearly all mammalian cell types, as well as during in vitro cell culture.

The molecular composition of microvesicles is diverse, containing and/or transporting a variety of nucleic acids, proteins and lipids. Microvesicle molecular composition is generally reflective of the plasma membrane and antigenic content of the cell types, tissues and organs from which they originate. Mathivanan and Simpson, "Exosomes: extracellular organelles important in intercellular communication," J. Proteomics 73(10):1907-1920 (2010). Although protein composition of the microvesicles varies, most of these structures are enriched for various soluble protein markers, including HSP70, Hsc70, CD63, CD9, CD81 and others. Circulating microvesicles have also been reported to contain nucleic acids, including messenger RNAs, DNAs, and relatively high levels of small RNAs and microRNAs.

Circulating microvesicles are associated with numerous cell functions, including intercellular (cell-to-cell) communication, removal of metabolic byproducts and toxins (including misfolded proteins, cytotoxic agents and metabolic waste), angiogenesis, tissue regeneration, endocytic recycling of the plasma membrane, selective removal of plasma membrane proteins and regulation of immune functions such as antigen presentation. Some microvesicles have been shown to transport messenger RNA (mRNA) and microRNA (miRNA), which is highly suggestive of microvesicles functioning as messengers that allow one cell type to regulate the activity of a distant cell type by acting as a shuttle that can merge with the distant cell and release its contents into that target recipient cell. This microvesicle shuttle can utilize the body fluids to travel to distant sites and control the activity of distant target cells.

Circulating microvesicles (cMVs), or synonymously, extracellular microvesicles (eMVs) or extracellular vesicles (EVs herein), describe an eclectic group of microvesicles that are released by cells, and therefore, exist in extracellular spaces and/or reside in body fluids. The mammalian body fluids that are known or suspected to contain cMVs include, but are not limited to, blood, urine, saliva, breast milk, tears, sweat, ascites fluid and cerebrospinal fluid. Secreted microvesicles are also found in cell culture media that has been exposed to cultured mammalian cells.

With regard to defining and categorizing the cMV molecules that can be found in body fluids, there is lack of consensus as to the nomenclature and description of the different types of cMV particles. Some literature distinguishes at least three subcategories of circulating microvesicles, based on their mechanistic origin. The molecular/cellular mechanisms that produce microvesicles are theorized to include (i) exocytosis of intracellular multivesicular bodies, (ii) outward budding, fission and shedding of plasma membrane, and (iii) byproducts of apoptosis. The diverse collection of circulating microvesicle structures can range in size from about 20 nanometers (nm) to upwards of about 1,000 nm (i.e., 1.0 micrometer, micron, or μητι) in diameter.

The first recognized subgroup of cMVs are those produced by direct plasma membrane budding, fission and shedding. Some sources describe these shed microvesicles as generally large, namely with lower sizes limits of at least 100 nm or 200 nm, and with an upper size limit of about 1,000 nm in diameter. Some have proposed that these structures be termed "ectosomes" or "shedding microvesicles (SMVs)." Still other groups state that ectosome particles may be as small as 40 or 50 nm in diameter.

A second recognized subgroup of cMVs are exosomes, that is, the preformed microvesicles that are released from the cell following the exocytic fusion of intracellular multivesicular bodies with the plasma membrane. These exosome structures are generally smaller than ectosomes, and have an upper size limit estimated to be about 100, 150 or 200 nm, and a lower size limit of about 40 nm or 50 nm. However, various sources differ in their size-based definitions for exosomes, and this size distinction remains unresolved.

A third group of structures is the apoptotic blebs released by dying cells. These membrane structures have a less well-defined size range, and may be anywhere from about 50 nm to about 5,000 nm in diameter.

A unified microvesicle nomenclature and classification system utilizing broadly accepted definitions has been elusive in the field. In the literature, microvesicles have been alternatively referred to as microparticles, nanoparticles, exosomes, ectosomes, epididimosomes, argosomes, exosome-like vesicles, promininosomes, prostasomes, dexosomes, texosomes, archeosomes, oncosomes, exosome-like vesicles, apoptotic blebs, extracellular vesicles and shedding microvesicles. In some publications, uses of these terms is conflicting or overlapping. Simpson and Mathivanan (2012), "Extracellular Microvesicles: The Need for Internationally Recognized Nomenclature and Stringent Purification Criteria". J Proteomics Bioinform (2). doi:10.41721/jpb.10000e10. One source suggests that a preferred nomenclature for circulating microvesicle is based on the microvesicles mechanism of origin. Namely, these categories would be (i) the ectosomes produced by membrane budding, (ii) the exosomes produced by the exocytosis to intracellular multivesicular bodies, and (iii) the membrane blebs produced by the process of apoptosis.

The release of exosomes was highlighted from different cell types in a variety of physiological contexts. Thus, it has been shown that B cells release exosomes bearing molecules of the major histocompatibility complex class II, which play a role in antigen presentation (Raposo et al., *J. Exp. Med.* 183 (1996) 1161). Similarly, it has been shown that dendritic cells produce exosomes (also referred dexosomes) with specific structural and functional characteristics, and playing a role in mediating the immune response, including the stimulation of cytotoxic T lymphocytes (Zitvogel et al., *Nature Medicine* 4 (1998) 594). It has also been shown that tumor cells secrete in a controlled manner, specific exosomes (also designated texosomes) bearing tumor antigens and are able to present these antigens or to transmit them to antigen-presenting cells. It is also known that mast cells accumulate molecules in intracellular vesicular compartments, which can be secreted in response to signals (Smith and Weis, *Immunology Today* 17 (1996) 60). In general, it seems that the cells emit signals and communicate with each other through membrane vesicles they release, which may carry antigenic patterns, MHC molecules, or any other signal (cytokine, growth factor, etc.) which have special structural and functional characteristics and are produced in different physiological situations.

I. Bioparticle Reduction in Biofluids of an Organism

The present invention provides for contact of biofluid of a subject with a composition containing porous beads capable of targeted sequestration and/or reduction of bioparticles from the contacted biofluid. Such compositions can optionally be implantable, and can include an outer, porous membrane and/or porous cellulose, mesh or other biocompatible layer, which surrounds or otherwise segregates the porous bead content from, e.g., surrounding tissues and/or cells, while allowing for bioparticles originally present in a biofluid to contact and be sequestered by the porous beads. Optionally, the composition containing the porous beads is a pouch or device bounded by a porous membrane and/or porous cellulose. In certain embodiments, the porous beads are siliceous beads, such as diatomaceous earth and/or perlite. Various implantable membranes, sacs and/or pouches that are contemplated as adaptable for use with the porous beads of the invention have been described in the art, including at, e.g., EP 1466632; U.S. Pat. Nos. 8,591,531; 6,262,255; 5,713,888; and US 2014/0014226.

It is newly contemplated herein that undesired and/or deleterious signaling activities attributable to bioparticles that are present within a biofluid of an organism (e.g., within urine, saliva and/or other bodily fluids of a subject, in plants, or within growth media of cells in culture, including cells of animals single-celled organisms) can be disrupted simply via contacting of such biofluid(s) with porous beads (optionally contained within a biocompatible pouch and/or device) capable of sequestering and/or reducing the level of targeted bioparticles (e.g., EVs, e.g., exosomes) that are originally present in such biofluid(s).

II. Liquid Samples

The present invention provides methods for sequestering and/or reducing circulating bioparticles within liquid samples. It is not intended that the nature of the liquid samples be in any way limited, and can be any liquid sample that contains bioparticles. Advantageously, very small volumes of liquid sample can be contacted, for example, as little as about 10 µL, 50 µL, 0.1 mL, 0.2 mL, 0.3 mL, 0.4 mL, 0.5 mL, 1.0 mL, or 2.0 mL or 3.0 mL or 5.0 mL of starting sample can be used.

In some embodiments, the liquid that is contacted is a biofluid (synonymous with body fluid). The body fluid that is contacted with a composition of the invention or used in a method of the invention is not particularly limited. Bioparticles can be sequestered or reduced within any body fluid using the methods of the invention, even though a particular body fluid is not itemized herein, as it is intended that the present methods find use with any and all body fluids. For example, body fluids that can be contacted with the compositions and/or treated with the methods of the invention include, but are not limited to, amniotic fluid, blood serum, blood plasma, breast milk, cerebrospinal fluid, lymph, mucus (including nasal drainage and phlegm), pericardial fluid, peritoneal fluid, semen, synovial fluid, tears, urine, sweat, saliva, and ascites fluid.

In some embodiments, the contacted liquid can be conditioned cell culture media that has been used to culture a cell line in vitro that has produced bioparticles, and therefore, those bioparticles are now contained in the conditioned media. The conditioned cell culture media can be a complete media (containing a serum supplement), or a serum-free culture media.

In some embodiments where the conditioned cell culture media is a complete media comprising a serum supplement, the serum supplement that is used can be a serum that has been depleted of any endogenous circulating bioparticles prior to addition of the supplement to the defined minimal growth media. The present invention also provides methods for producing such bioparticle-depleted serum.

III. Matrix Reagents

The present invention provides methods and compositions for sequestration and/or reduction of bioparticles that, without wishing to be bound by theory, appear to exploit pore sizes of certain materials to effect bioparticle enrichment, such as the pore sizes found in porous beads, such as siliceous beads or particles, examples of which include diatomaceous earth (DE) and perlite. In certain embodiments, the porous beads (e.g., porous siliceous beads) are non-calcinated, non-acid washed, (i.e. natural grades) diatomaceous earth with average pore sizes ranging from 0.1 to 10 microns and permeabilities less than 2 darcies. In some embodiments, the porous beads (e.g., porous siliceous beads) are Perlite (i.e. treated volcanic glass) with pore sizes from 0.1 to 10 microns and permeabilities less than 2 darcies. It is contemplated that matrix reagents with average pore sizes in the range of 0.01 micron to 50 microns, including in the range of 0.01 to 1 micron, 0.5 to 40 microns, 0.5 to 50 microns, 1 to 20 microns, 1 to 10 microns, 2 to 5 microns, and/or about 3, 4, and/or 5 microns are effective reagents for isolation of microvesicles/bioparticles as described herein. Similarly, it is contemplated that agents with permeabilities of less than 5 darcies, less than 2 darcies, less than 1 darcy, less than 0.5 darcies, less than 0.3 darcies, or smaller can be effective reagents for the methods and compositions of the invention. Exemplary grades of DE are non-calcinated, non-acid washed, "natural" forms possessing pore sizes between 0.5-2 microns in diameter and permeability below 0.1 Darcies. Certain exemplary Perlite grades have a permeability below 3 and pore sizes below 10 microns.

EXAMPLES

The following examples are offered to illustrate, but not limit, the claimed invention.

It is understood that various modifications of minor nature or substitutions with substantially similar reagents or components will be recognizable to persons skilled in the art, and these modifications or substitutions are intended to be included within the spirit and purview of this application and within the scope of the appended claims.

Bioparticles, particularly extracellular vesicles (EVs), including exosomes, have recently been identified as important signaling moieties during initiation/establishment and/or progression of certain diseases and disorders, including hyperproliferative diseases such as cancer. Porous beads were previously identified (PCT/US2015/043768) as capable of isolating a range of bioparticles from contacted biofluids.

The current invention, at least in part, contemplates administration of porous bead compositions directly to a subject or organism, to cause sequestration and/or reduction of signaling bioparticle levels within a biofluid of a contacted subject, for advantageous, e.g., therapeutic, effect.

Example 1: Use of Porous Beads to Reduce Levels of Bioparticles in Biofluids

Figure 2:
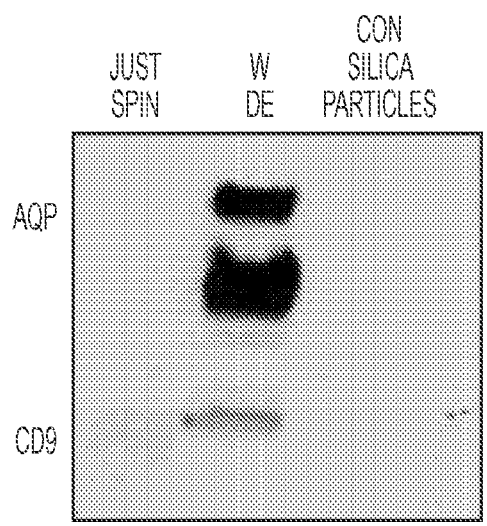
FIG. 2 shows that Diatomaceous Earth (DE) isolated vesicle protein markers from urine, whereas control silica did not. A single 9 ml first void clean catch urine sample was split into three equal samples that were then 1) subjected to 2×1500 g spin, 2) exposed to DE protocol, or 3) exposed to Silica particles as a control. The resulting preps were loaded onto a SDS-PAGE gel transferred to Nitrocellulose and immunostained using antibodies specific for extracellular vesicle (EV) markers Aquaporin 2 and CD9. Protocol: 1 gram of DE or Control Silica particles were washed twice in PBS and then resuspended in 10 mls of PBS plus protease inhibitors. After vigorous vortexing, 150 µl of each slurry was pipetted into separate 3 ml aliquots of a cell-free urine sample in 15 ml polypropylene tubes. The tubes were rotated slowly for 30 minutes then spun at 1500 g for 2 minutes. The urine supernatant was discarded and the pellets were washed 2× with 3 mls of PBS. After the second wash the pellets were suspended in 100 µl of Laemmli buffer, boiled for 3 minutes and 50 µl of each was loaded onto a SDS PAGE gel. "Just Spin" control used the same protocol except no DE was added—which demonstrated that DE was required.
Figure 3:
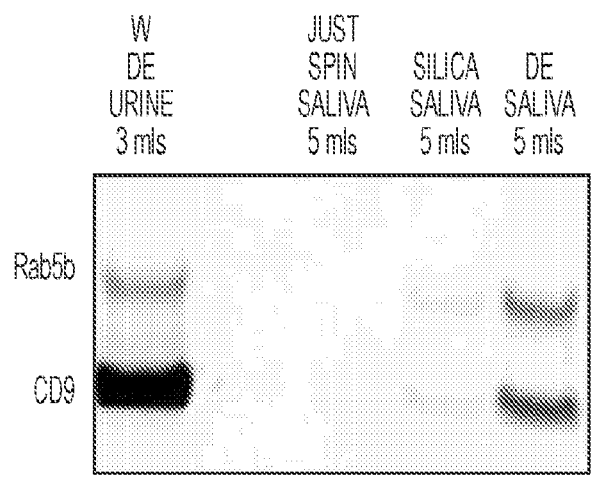
FIG. 3 shows that DE isolated saliva exosomes. Immunoblot was performed using mAbs specific for vesicle markers Rab5 and CD9. Lane 1; bioparticle prep of 3 ml urine sample using DE (protocol as per FIG. 2), Lane 2; blank, Lane 3; 2×1500 g spin of 5 mls of cell free saliva, Lane 4; 5 mls cell-free urine treated with silica particles, Lane 5; 5 mls cell-free urine treated with Diatomaceous Earth. Saliva Protocol: 7.5 mls of saliva was diluted with 7.5 mls of PBS. Then it was spun 2×2000 g to remove cells, cell debris, and mucous. The resulting supernatant was split into 3, 5 ml aliquots. One aliquot (negative control) was spun two more times at 1500 g. Either 150 µl of silica beads or Diatomaceous Earth prepped as per FIG. 2 legend were added to the other two aliquots and then processed as per FIG. 2.
Figure 4:
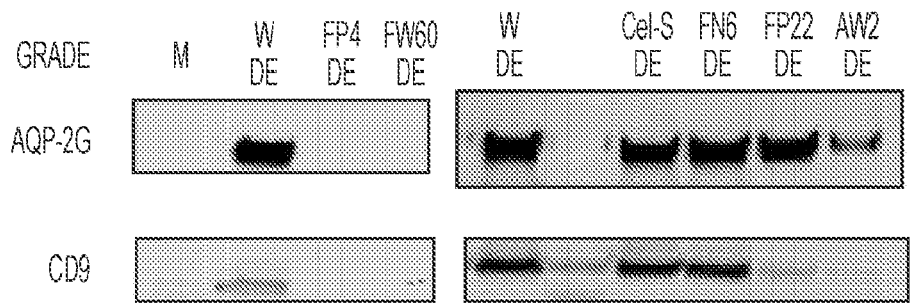
FIG. 4 shows that DE (optionally non-calcinated (N) and low permeable/small pore size) isolated EVs from urine. It was noted that the calcinated and larger pore diameter DE Grades were less effective at isolating biparticle/EV markers under the conditions assayed; C=calcinated; N=non-calcinated. Permeability was measured in Darcies (the higher the value, the more permeable the composition). A single first void clean catch urine sample was split into 5 ml aliquots in 15 ml polypropylene tubes and was exposed to 300 µl of a slurry (1 g into 10 mls of PBS) of different grades of DE acquired from several sources (see below). The mixture was incubated at RT for 20 minutes, then the DE was removed from the mixture by a 3 minute 1500×g spin (supernatant poured off). The treated DE was washed 2× by 5 mls of PBS then suspended in 150 µl of Laemmli buffer. 50 µl of this was run on SDS PAGE gel and transferred to Nitrocellulose. The Nitrocellulose was probed with mAbs specific for extra-cellular vesicle markers CD9 and Aquaporin 2. Shown are signals from glycosylated Aquaporin-2 and CD9, as judged by MW and important properties (if known) of each grade of DE. Grades and sources of Diatomaceous Earth: W=Natural Food Grade DE from PermaGuard; FP-4=Calcinated DE from Ep Minerals (Reno Nevada); FW-60=Calcinated DE from Ep Minerals (Reno Nevada); FP-22=Calcinated DE from Ep Minerals (Reno Nevada); FN-6=Natural DE from Ep Minerals (Reno Nevada); Cel-S=Natural DE (Brand Name Celite-S) from Sigma Aldrich; AW-2=Acid Washed DE from Ep Minerals (Reno Nevada).
Figure 5:
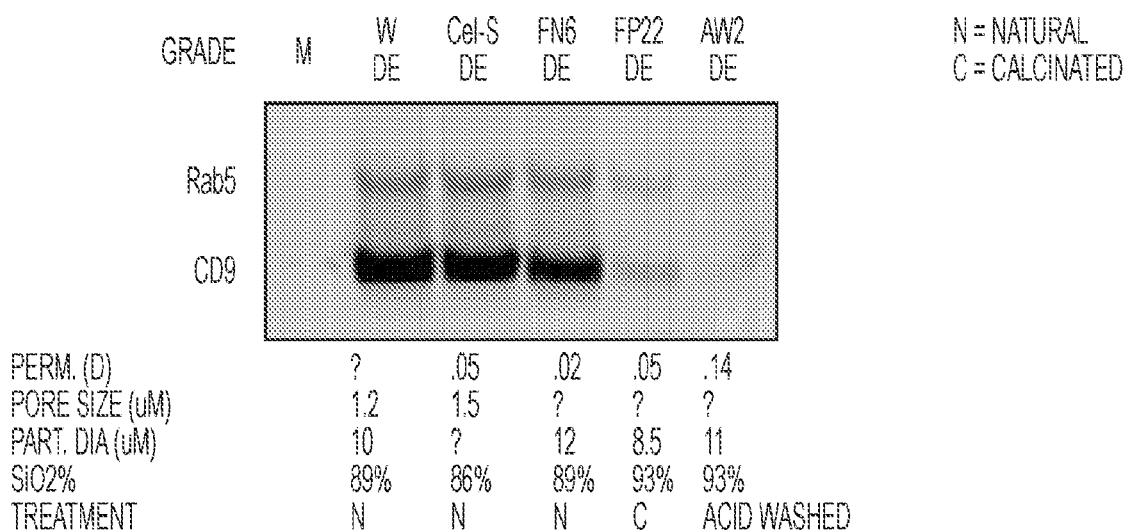
FIG. 5 shows that calcination and acid washing decreased DE's affinity for exosomes. A single first void clean catch urine sample was split into 5 ml aliquots in 15 ml polypropylene tubes and exposed to 300 µl of a slurry (1 g into 10 mls of PBS) of different grades of DE acquired from several sources (see FIG. 4 Description). The mixture was incubated at for 20 minutes, then the DE was removed from the mixture by a 3 minute 1500×g spin (supernatant poured off). The treated DE was washed 2× by 5 mls of PBS then suspended in 150 µ of Laemmli buffer. 50 µl of this was run on SDS-PAGE and transferred to Nitrocellulose. The Nitrocellulose was probed with mAbs specific for extra-cellular vesicle markers CD9 and Rab5. Shown are signals from Rab5 and CD9, as judged by MW and important properties (if known) of each grade of DE.
Figure 6:
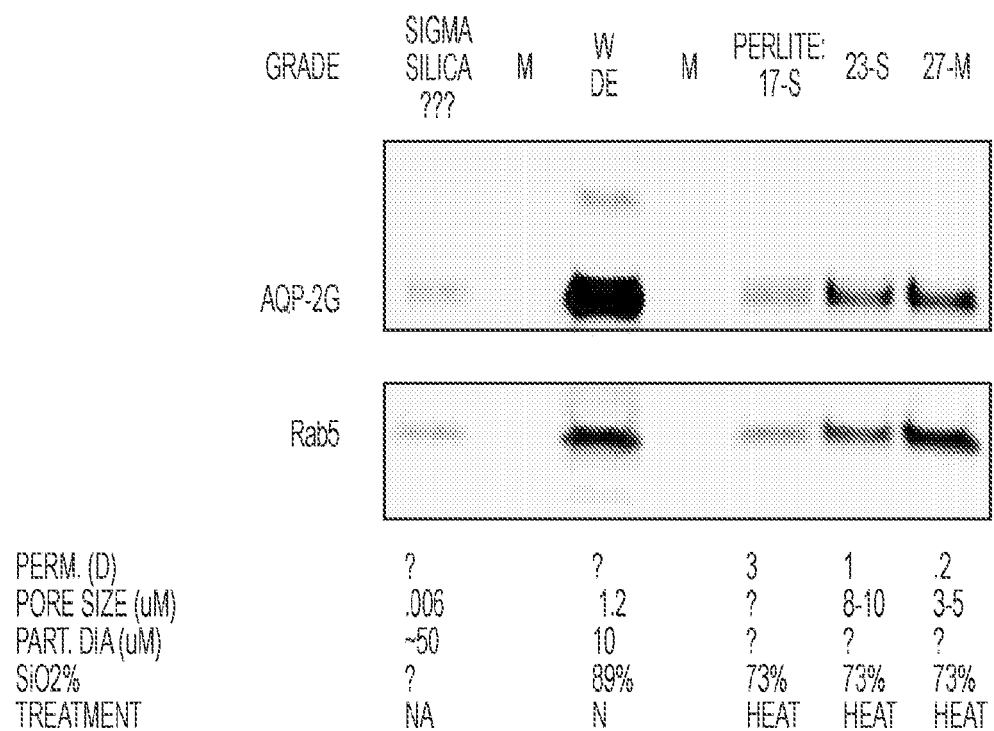
FIG. 6 demonstrates that Perlite (Sil-Kleer) with smaller pore sizes/permeability could also isolate Extra-cellular Vesicles. SilKleer is the commercial name for a type of Perlite which is volcanic glass heated to expand and form pores. It contains less $SiO_2$ than DE. Methods: A single first void clean catch urine sample was split into 5 ml aliquots in 15 ml polypropylene tubes and exposed to 300 µl of a slurry (1 g into 10 mls of PBS) of different grades of Diatomaceous Earth or Perlite acquired from several sources (see below). The mixture was rocked slowly for 20 minutes then the DE was removed from the mixture by a 3 minute 1500×g spin (supernatant poured off). The treated DE was washed 2× by 5 mls of PBS then suspended in 150 µl of Laemmli buffer. 50 µl of this was run on SDS PAGE gel and transferred to Nitrocellulose. The Nitrocellulose was probed with mAbs specific for extra-cellular vesicle markers CD9 and Aquaporin 2. Shown are signals from glycosylated Aquaporin-2 and Rab5 as judged by MW and important properties (if known) of each grade of DE. Grades and sources of Diatomaceous Earth: W=Natural Food Grade DE from Perma-Guard; 17-S=#17-S grade Perlite (Sil-Kleer) from Silbrico Corp (Hodgkins, IL); 23-S=#23-S grade Perlite (Sil-Kleer) from Silbrico Corp (Hodgkins, IL); 27-M=423-S grade Perlite (Sil-Kleer) from Silbrico Corp (Hodgkins, IL).
Figure 7:
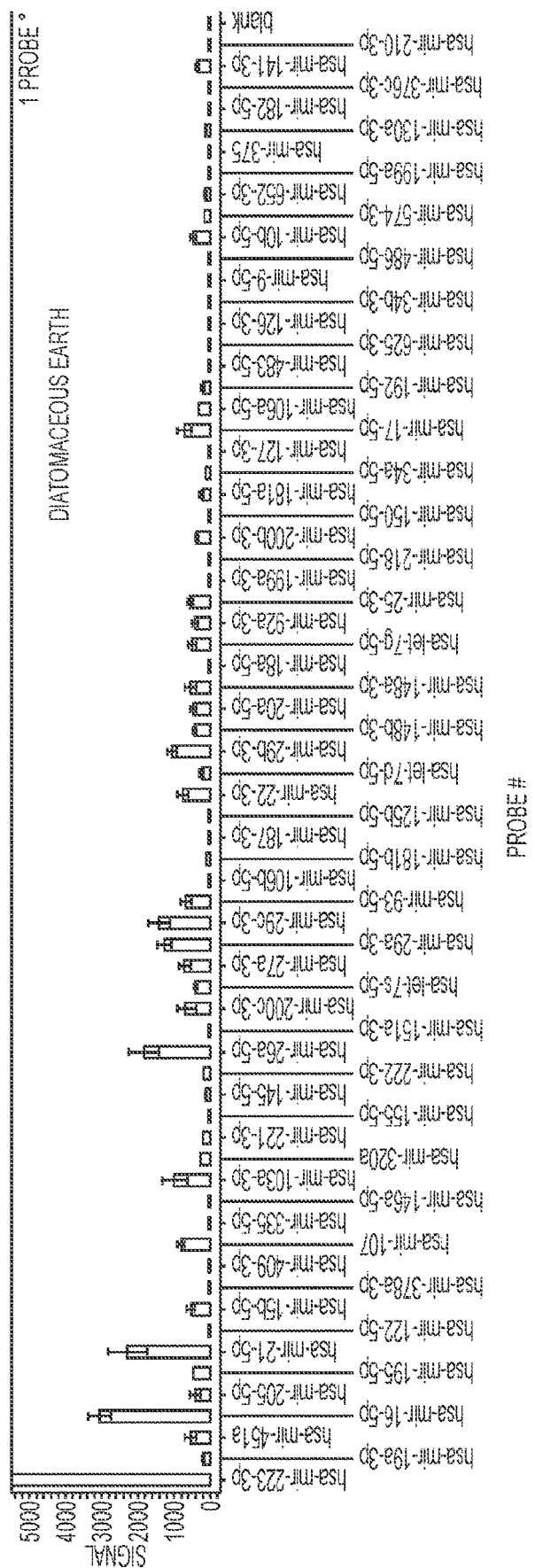
FIG. 7 shows that Diatomaceous Earth (DE) purified complex RNA. DE-purified microRNA was more complex than Norgen kit: RNA from identical 30 ml samples was isolated via DE or Norgen kit and analyzed for microRNA level with Firefly miRNA Array Panel.
Figure 7:
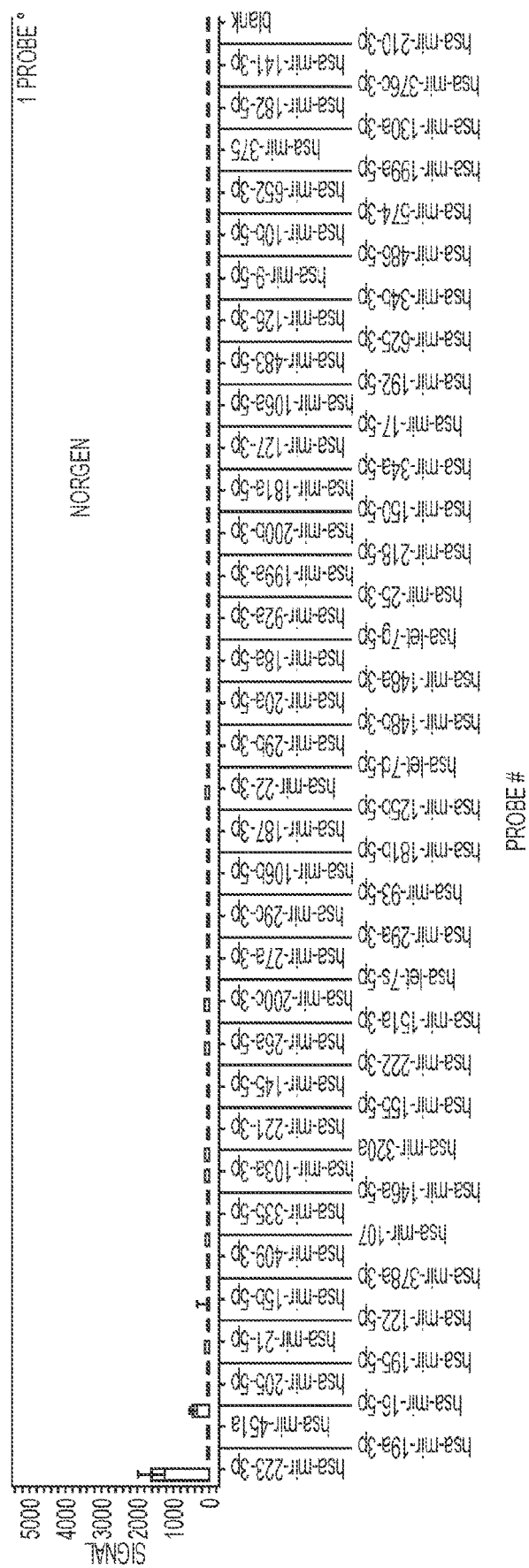
Figure 8:
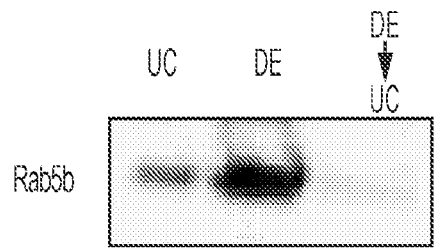
FIG. 8 shows that DE isolated (and depleted) exosomes from cell culture media. Jurkat Cells were grown for 24 hours in DMEM media plus 5% Fetal Bovine Serum. Cells and debris were spun out of 2 mls of the media for 10 minutes at 1500×g. The resulting cell free media was split in two and subjected to a DE protocol (see FIG. 2) or an Ultracentrifugation protocol. Furthermore, the bioparticle-depleted supernatant from the DE protocol was saved and subjected to the ultracentrifugation protocol. The pellets from all three procedures were suspended in Laemmli buffer, and half of that suspension was loaded on an SDS PAGE gel, and was then transferred to Nitrocellulose and was probed with a monoclonal antibody (mAb) specific for vesicle marker Rab5. Lane 1; Ultracentrifuge isolated vesicles. Lane 2; DE isolated vesicles. Lane 3; DE treatment almost completely depleted cell culture media of vesicle-derived Rab5.

A broad range of biomarkers are secreted from cells, such as miRNA, proteins, lipids, glycoproteins, DNA, mRNA, tRNA, etc., which can exist in relatively stable form outside of cells, including but not limited to the following forms: protein-nucleic acid complexes, exosomes, microvesicles, LDL particles, and apoptotic bodies (FIG. 1). It was identified that Diatomaceous Earth (DE) isolated vesicle protein markers from urine, whereas control silica did not (FIG. 2). Diatomaceous Earth (DE) was also identified to isolate saliva exosomes (FIG. 3). DE (optionally non-calcinated (N) and low permeable/small pore size) also isolated EVs from urine (FIG. 4). Calcination and acid washing were identified to decrease DE's affinity for exosomes (FIG. 5). To examine the effect of pore size upon efficacy of isolation of bioparticles from biofluids, Perlite (Sil-Kleer) possessing smaller pore sizes/permeability that DE was examined, and was also identified to isolate EVs (FIG. 6). Consistent with its isolation of intact EVs, Diatomaceous Earth (DE) was shown to have purified complex RNA, e.g., a variety of miRNAs FIG. 7). In a proof-of-concept experiment relevant to therapeutic use of porous beads to disrupt bioparticle (e.g., EV)-mediated signaling, DE was demonstrated to have isolated (and depleted) exosomes from cell culture media, as demonstrated by the absence of EVs within a sample exposed to DE treatment and followed by ultracentrifugation—DE almost completely depleted the contacted cell culture media of vesicle-derived Rab5, consistent with dramatic levels of sequestration/reduction of EVs in the sample (FIG. 8).

Figure 9:
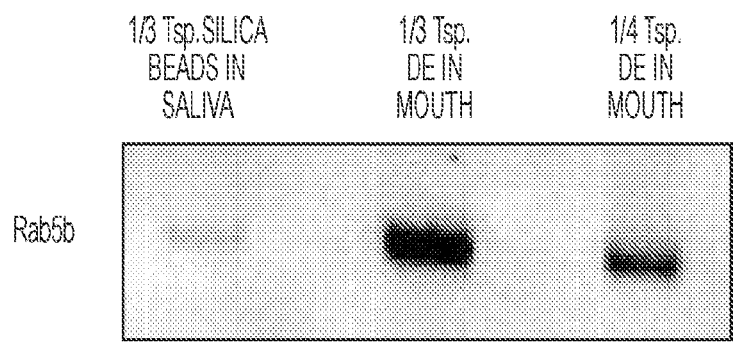
FIG. 9 shows that DE placed in a porous cellulose bag and then held in a human mouth for 30 minutes isolated the extra-cellular vesicle marker; Rab5b. Methods: A Cellulose paper tea bag (T-sac Inc.) was cut into a 2 inch by 2 inch square. ¼ teaspoon of unprocessed Silica gel (lane 1), or ⅓ teaspoon of unprocessed Diatomaceous Earth (lanes or ¼ of a teaspoon of unprocessed Diatomaceous Earth (lane 3) was placed into the paper and folded over 2×. For lane 1, 5 mls of saliva was diluted with 5 mls of PBS and spun at 2500×g for 8 minutes twice to remove mucous and cell debris. The silica gel in bag (lane 1) was placed in the cell-free supernatant in a 50 ml tube for 30 minutes. For lane 2 and 3 each DE containing bag was placed on one side of the mouth of a volunteer (51 year old male) tucked between the gum and side of the mouth for 30 minutes. After incubation, all 3 bags were washed 2× in PBS then opened. The contents were placed in a 15 ml tube and washed 2× more with PBS, each time the pellet being reformed by a 2 minute 2000×g spin. The final pellet was resuspended in 350 µl of 3× Laemmli buffer, run on SDS-PAGE, transferred to Nitrocellulose and immunoblotted with anti-CD9 and Rab5 antibodies.

Example 2: DE Placed in a Porous Container and Introduced to the Mouth of a Subject Isolated Exosomes As shown in FIG. 9, Diatomaceous Earth placed in a porous cellulose bag, which was then held in the mouth of a subject for 30 minutes successfully and robustly sequestered exosomes, as evidenced by detection of the exosomal marker, Rab5b. A control Silica gel placed in the same type of container (cellulose bag) was meanwhile shown not to sequester this marker from saliva.

Example 3: Therapeutic Reduction of Bioparticles in Urine of a Subject Having or at Risk of Developing Bladder Cancer In an exemplary therapeutic method of the invention, a subject having or at risk of developing bladder cancer is identified. Porous beads, e.g., DE, are deposited in a porous, implantable membrane-bounded pouch or device. The implantable pouch or device is inserted into the bladder of the subject, optionally at or near a site of an existing tumor, and in contact with the urine of the subject. The device remains implanted in the subject for an appropriate period of time (e.g., ranging from a single day to a number of months or even years, noting the inert/non-toxic nature of both the implantable pouch or device and its contents (e.g., DE)). Growth, progression and/or metastasis of cancer (or markers of pro-cancer signaling) in the subject is assessed, using art-recognized methods, relative to an appropriate control subject or value, and the therapeutic efficacy of the implantable pouch or device containing the porous beads (e.g., DE) is thereby assessed.

Optionally, the implantable pouch or device is removed from the subject, and sequestered biomarkers are examined (either via dissociation from the porous beads or via detection methods that do not require such dissociation). Therapeutic, diagnostic and/or prognostic associations and/or conclusions are detected using the isolated biomarkers.

Example 4: Prophylactic and/or Therapeutic Reduction of Bioparticles in Saliva of a Subject Having or at Risk of Developing Oral Cancer In an exemplary prophylactic and/or therapeutic method of the invention, a subject having or at risk of developing oral cancer (e.g., a tobacco user) is identified. Porous beads, e.g., DE, are deposited in a porous pouch or device. The pouch or device is inserted into the mouth of the subject, optionally at or near a site of an existing growth/tumor, or simply between the cheek and gum, contacting saliva of the subject. The pouch or device remains in the subject's mouth for an appropriate period of time (e.g., minutes to hours or longer, optionally co-administered with a dose of tobacco), noting the inert/non-toxic nature of both the pouch or device and its contents (e.g., DE)). Markers of pro-cancer signaling and/or growth, progression and/or metastasis of cancer in the subject is assessed (optionally over multiple administrations of a pouch or device of the invention), using art-recognized methods, relative to an appropriate control subject or value, and the prophylactic and/or therapeutic efficacy of the pouch or device containing the porous beads (e.g., DE) is thereby assessed.

Optionally, following contact with and removal from the subject, biomarkers sequestered within the pouch or device are examined (either via dissociation from the porous beads or via detection methods that do not require such dissociation). Therapeutic, diagnostic and/or prognostic associations and/or conclusions are made via detection of the isolated biomarkers.

FIGS. 10-16 and 18-21 illustrate exemplary embodiments of a collection device of the invention.

Figure 10A:
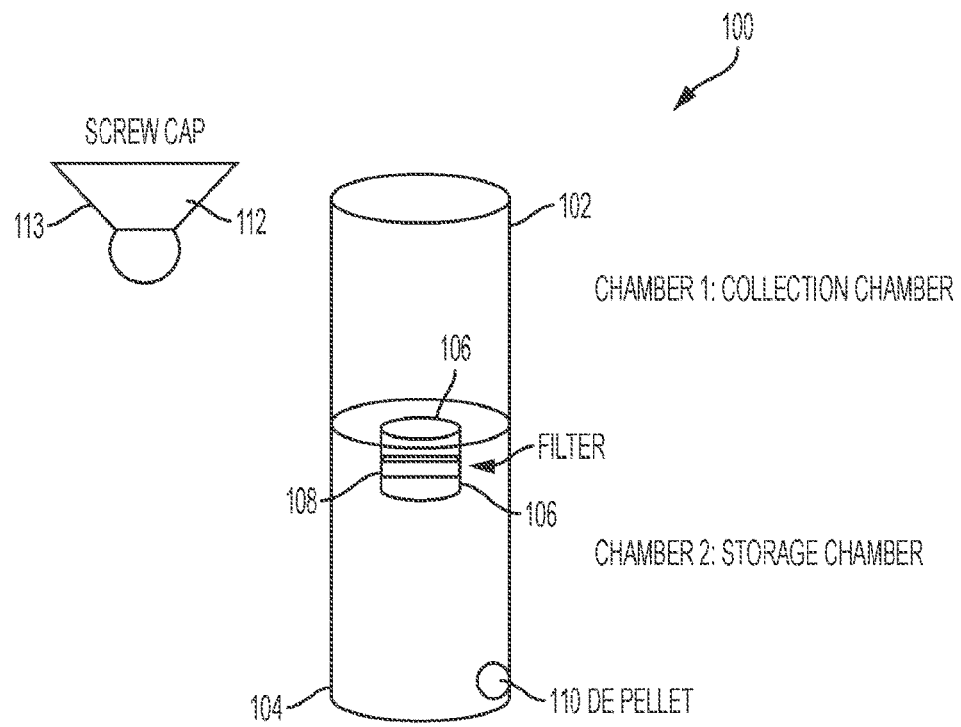
FIGS. 10A-10C depicts an exemplary embodiment of a collection device according to the invention.
Figure 10B:
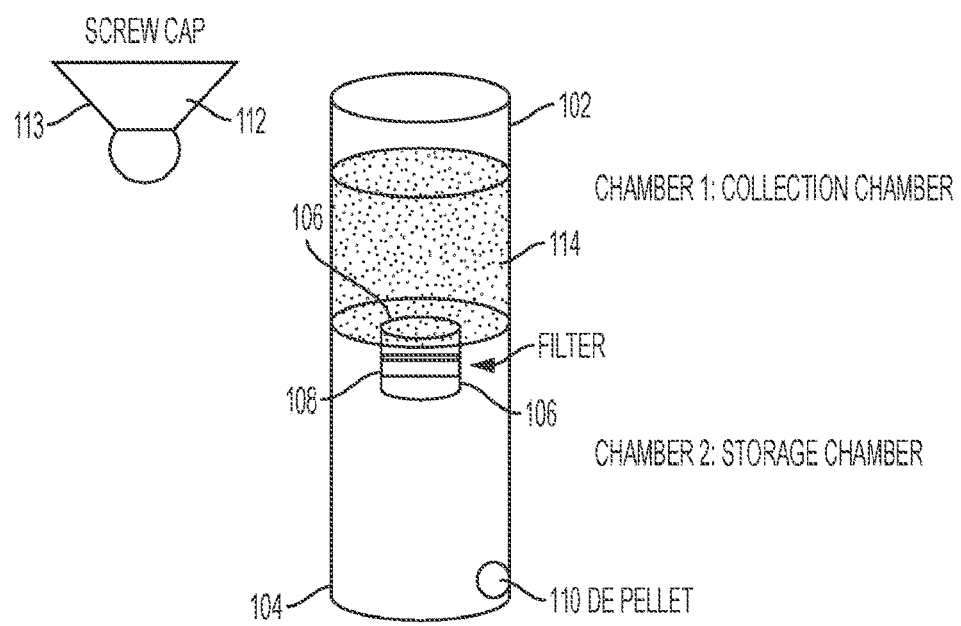
Figure 10C:
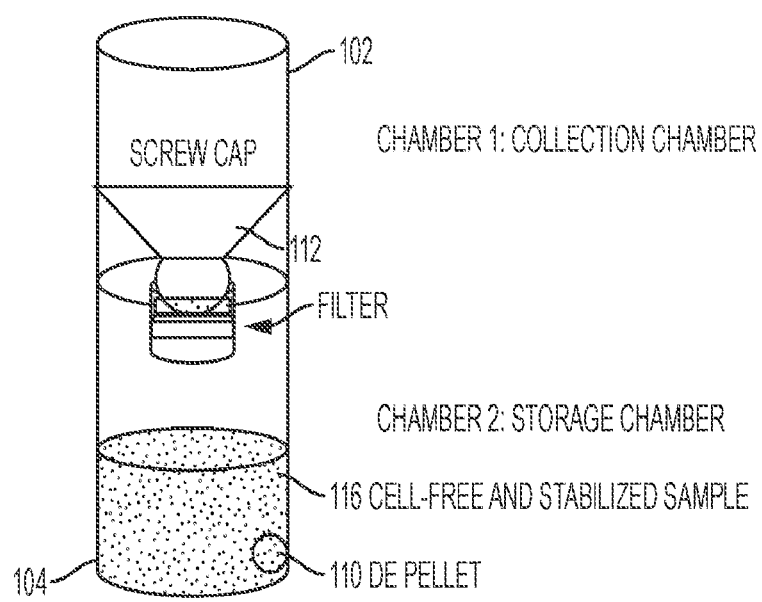
Figure 11:
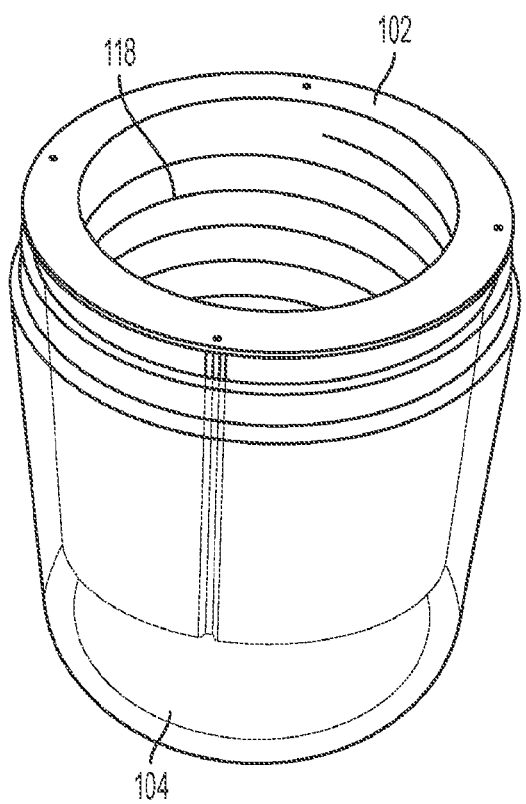
FIG. 11 shows a front, perspective view of an exemplary collection device.
Figure 12:
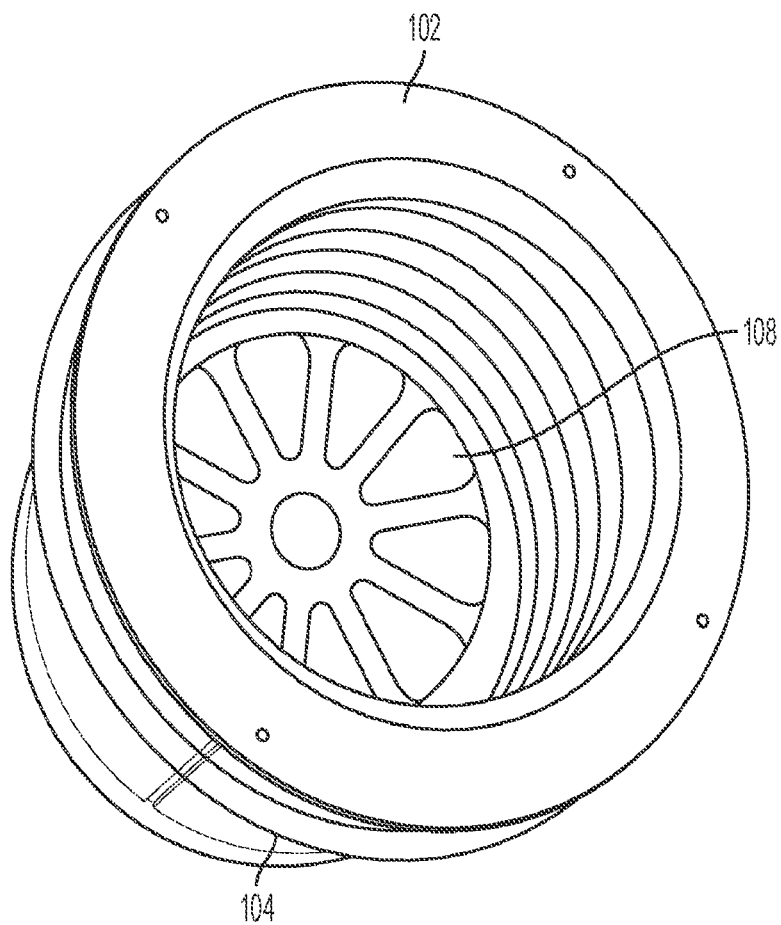
FIG. 12 shows a top view of an exemplary collection device.
Figure 13A:
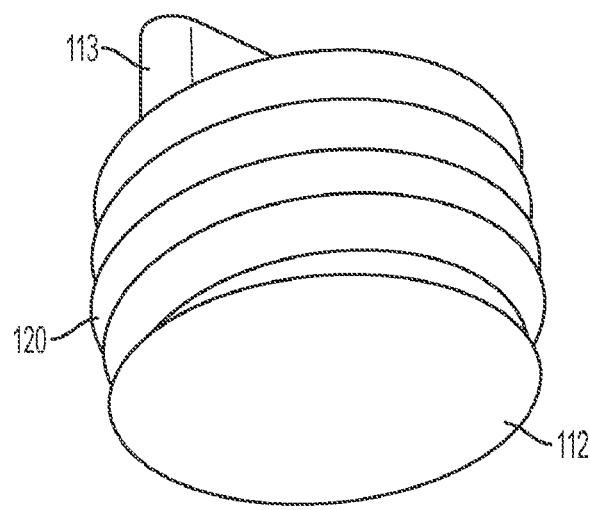
FIGS. 13A- and 13B show a bottom perspective view and top perspective view, respectively, of an exemplary screw cap plunger.
Figure 13B:
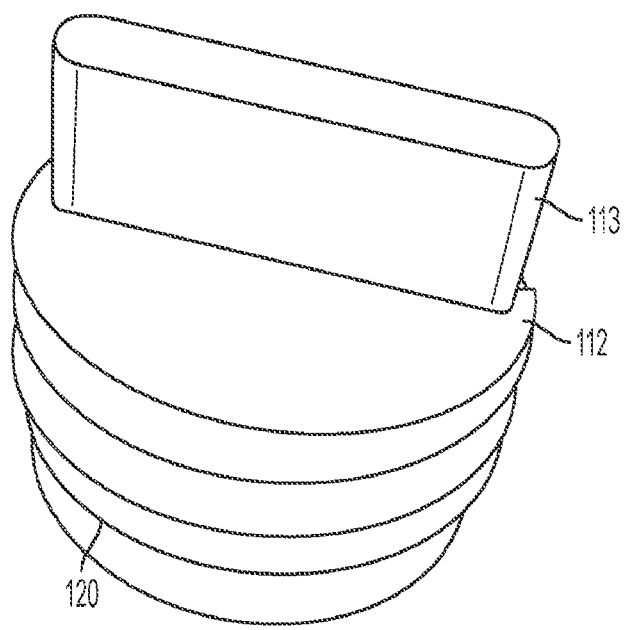

As shown in FIGS. 10A-10C, exemplary collection device 100 may include an upper chamber 102 and a lower chamber 104 separated by filter opening 106. Collection device 100 may further include screw cap 112. Collection device 100 may function to collect a urine sample 114 and removes cells from the urine sample prior to shipping. The urine sample is first deposited into upper chamber 102, as shown in FIG. 10B. Upper chamber 102 may have a capacity of about 100 mls, which may allow for the collection of a sample of at least 50 mls without significant splash. However, one of skill in the art will appreciate that the scale of collection device 100 may be altered as desired so as to increase or decrease the size and capacity of upper chamber 102 and lower chamber 104. For example, upper chamber 102 may be sized and configured to hold 50-500 mls (e.g., 50 ml, 100 ml, 150 ml, 200 ml, 250 ml, 300 ml, 350 ml, 400 ml, 450 ml, 500 ml, or any convenient size therebetween. Filter opening 106 may be located at the bottom of upper chamber 102. As shown in FIG. 10B filter opening 106 may be centrally located within the bottom surface of upper chamber 102. However, it is contemplated within the scope of the invention that the location of filter opening 106 may be in any desired position within the bottom surface of upper chamber 102. Additionally, while filter opening 106 is depicted as being circular, one of skill in the art will appreciate that the shape of filter opening 106 may be any desired shape (e.g., oval, square, rectangular, and the like). Filter opening 106 may be connected to filter housing 107 which houses filter 108. As shown in FIGS. 10A-10C, filter housing 107 protrudes from the bottom side of upper chamber 102 into the upper portion of lower chamber 104. It will be appreciated by one of skill in the art that the height of filter housing 107 may be varied as desired. Similarly, the position of filter 108 may be varied within filter housing 107 at desired. For example, filter 108 may be positioned medially within filter housing 107 as shown in FIG. 10A. However, it is also contemplated within the scope of the invention that filter 108 may be positioned proximal to the lower portion of filter housing 107 (not shown). Filter 108 may be comprised of a filter membrane composed of cellulose with a pore size that may range from about 0.1 microns to about 10 microns. This pore size may trap cells in the sample but allow most bioparticles to traverse. It is also contemplated within the scope of the invention that other types of filter membranes known to those of skill in the art may be used for filter 108.

Lower chamber 104 may have a capacity of about 100 mls, which will allow it to accommodate the entire urine sample that may be placed in upper chamber 102. As with upper chamber 102, the dimensions of lower chamber 104 may be varied by the skilled artisan as desired. The relative proportions of upper chamber 102 and lower chamber 104 may be the same, as shown in FIGS. 10A-10C. alternatively, the relative proportions of upper chamber 102 and lower chamber 104 as shown in FIGS. 11-16. Lower chamber 104 may contain diatomaceous earth particle 110. In an exemplary embodiment, diatomaceous earth particle 110 may comprise approximately 0.1 g of diatomaceous earth, which has the capability to isolate and stabilize bioparticles.

Screw cap plunger 112 has a handle 113 positioned on the top of screw cap plunger 112 to facilitate a user's ability to turn screw cap plunger 112. It is also contemplated within the scope of the invention, that handle 113 may be shaped in any of a variety of different forms that would facilitate a user's ability to turn screw cap plunger 112 such as, for example, a vertically protruding handle, a horizontally protruding handle, one or more knobs protruding from the top of screw cap plunger 112, one or more holes positioned within the top of screw cap plunger 112 etc.

Figure 14:
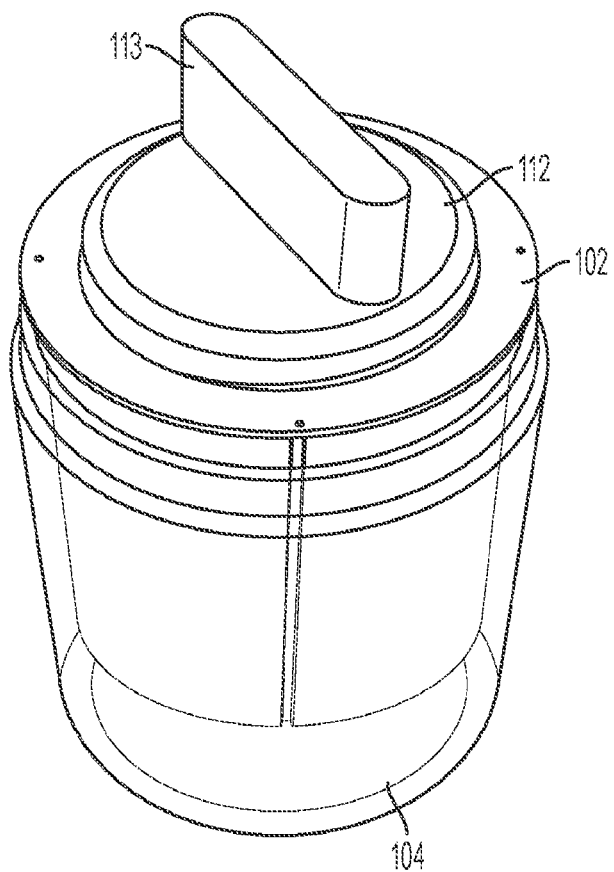
FIG. 14 shows a top perspective view of an exemplary collection device with the screw cap plunger placed within the collection chamber.

As shown in FIG. 10C, screw cap plunger 112 may be screwed into upper chamber 102 to apply force on the urine sample to push it through the filter 108 and into the lower chamber 104. In an exemplary embodiment, screw cap plunger 112 may have threads 120 (FIG. 13A-13B) on the sides that fit into grooves 118 (FIG. 11) present in the lower chamber 104 that facilitate the downward manipulation of screw cap plunger 112 by any of a variety of user manipulations such as, for example, turning or pushing. FIG. 14 depicts the insertion of screw cap plunger 112 into upper chamber 102.

Figure 15:
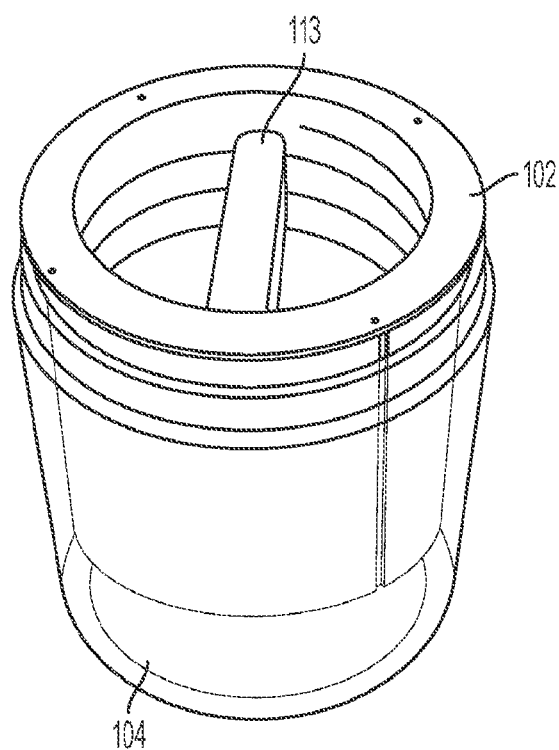
FIG. 15 shows a top perspective view of an exemplary collection device with the screw cap plunger placed within the collection chamber and screwed down to the point near contact to the membrane, which forces the sample through the membrane and into the storage chamber.
Figure 16:
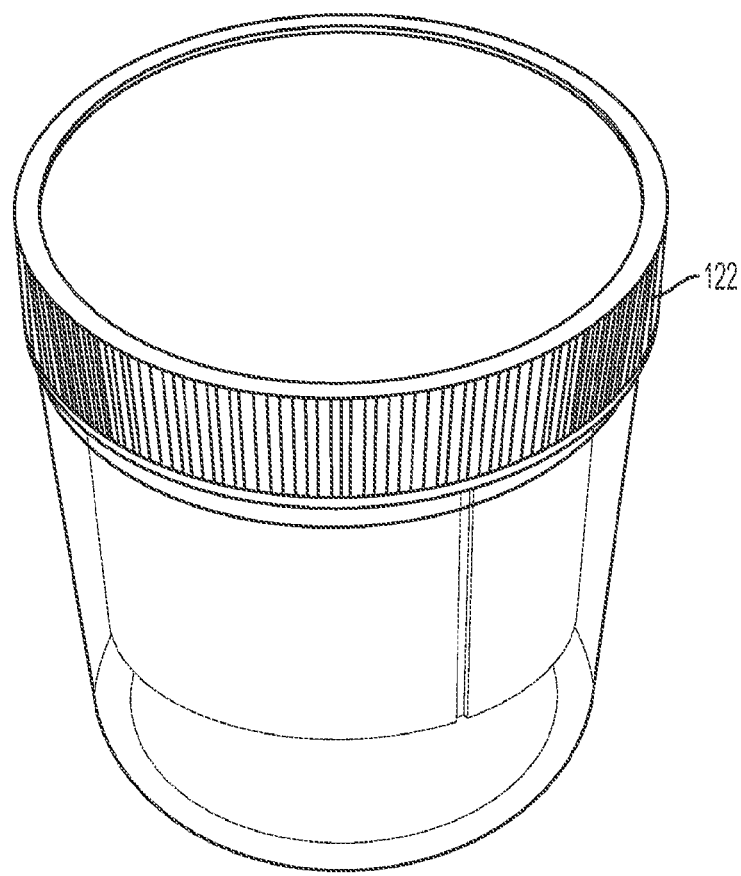
FIG. 16 shows a top perspective view of an exemplary collection device after application of the screw cap plunger with a final external cap in place sealing the entire device. The device is now ready for shipment. Alternatively, the collection chamber with screw cap plunger can be removed prior to capping the storage chamber for shipment.

Once the screw cap plunger 112 is manipulated down into upper chamber 102 as shown in FIG. 15, the filtered sample 116 is forced through the membrane into lower chamber 104 the entire assembly can be capped with cap 122 as shown in FIG. 16 and either shipped or stored. In another exemplary embodiment, the lower chamber 104 plus Screw Cap Plunger 112 may be easily removed from the assembly before capping the Storage Chamber with sample and diatomaceous earth.

Figure 17:
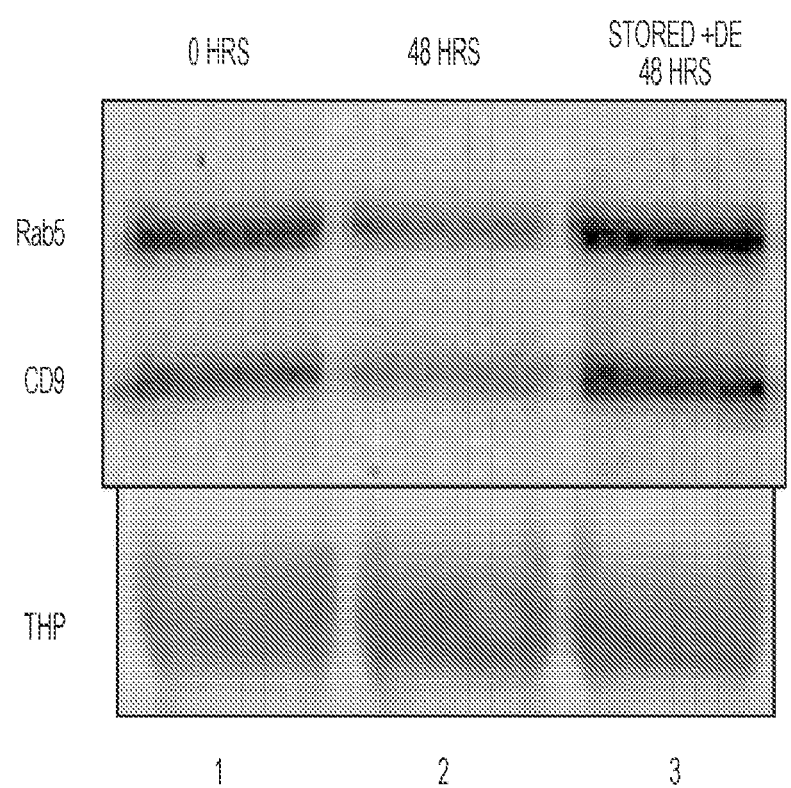
FIG. 17 shows the results of an experiment demonstrating that diatomaceous earth can stabilize extra-cellular vesicle protein markers in urine subjected to storage for 48 hours and a freeze-thaw event. Depicted are an immunoblot (above) and a protein stain showing THP. Lane 1: extra-cellular vesicle markers from a prep of a sample taken immediately after donation. Lane 2: extra-cellular vesicle markers from a prep of the same sample depicted in Lane 1, but after 48 hours of storage and a freeze-thaw event. Clearly vesicle markers are degraded while THP is relatively stable. Lane 3: extra-cellular vesicle markers from a prep of the same sample depicted in Lane 1, but after 48 hours of storage and a freeze-thaw event with the inclusion of 100 ul slurry of 50% diatomaceous earth. Clearly the vesicle markers have not been degraded.
Figure 18A:
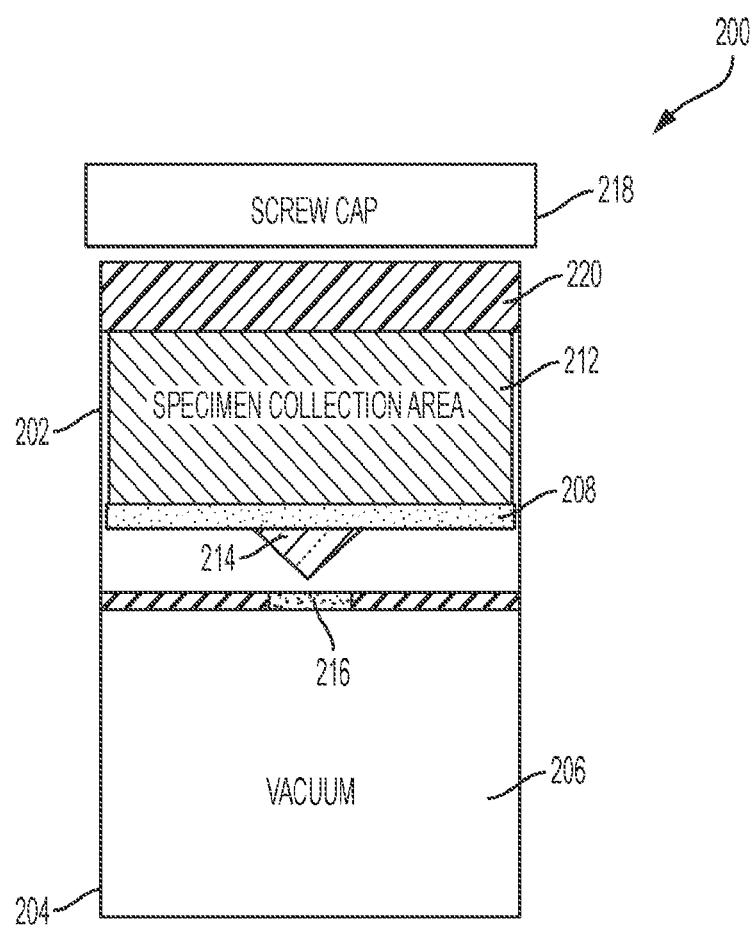
FIGS. 18A-18C show a diagram of an exemplary embodiment of the device in which the force is supplied by a vacuum placed below the filter (FIG. 18A; red).
Figure 18B:
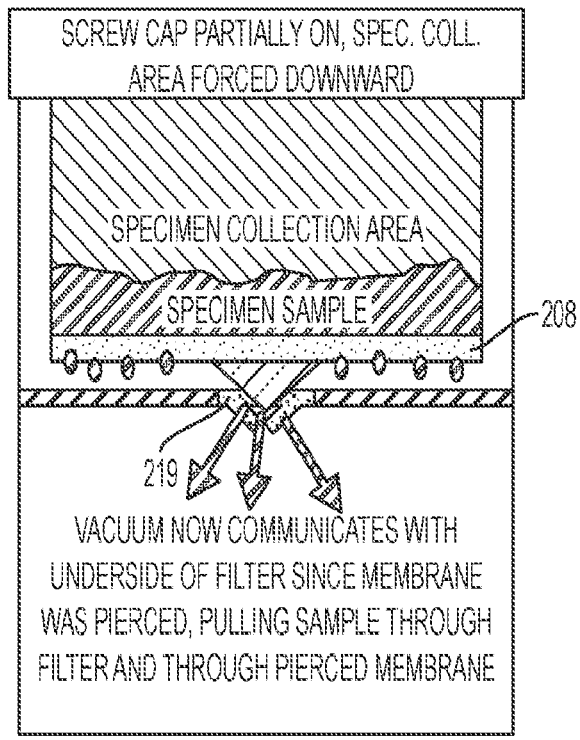
Figure 18C:
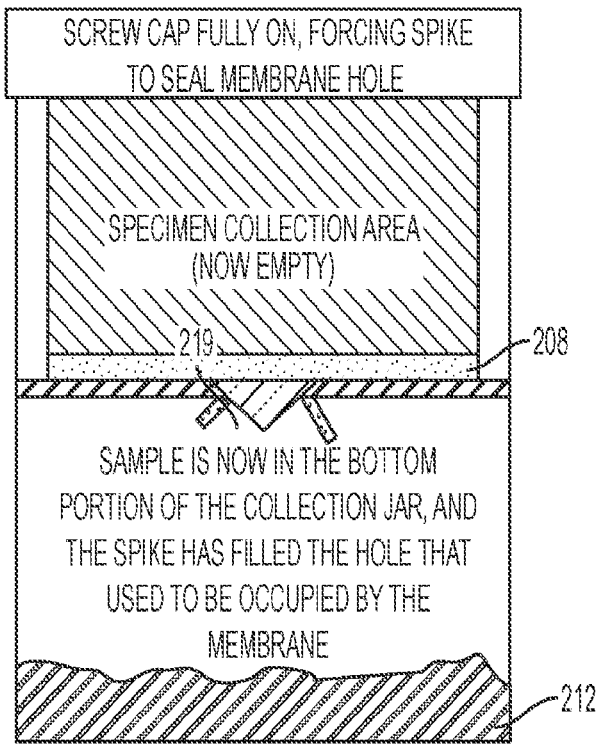
Figure 19A:
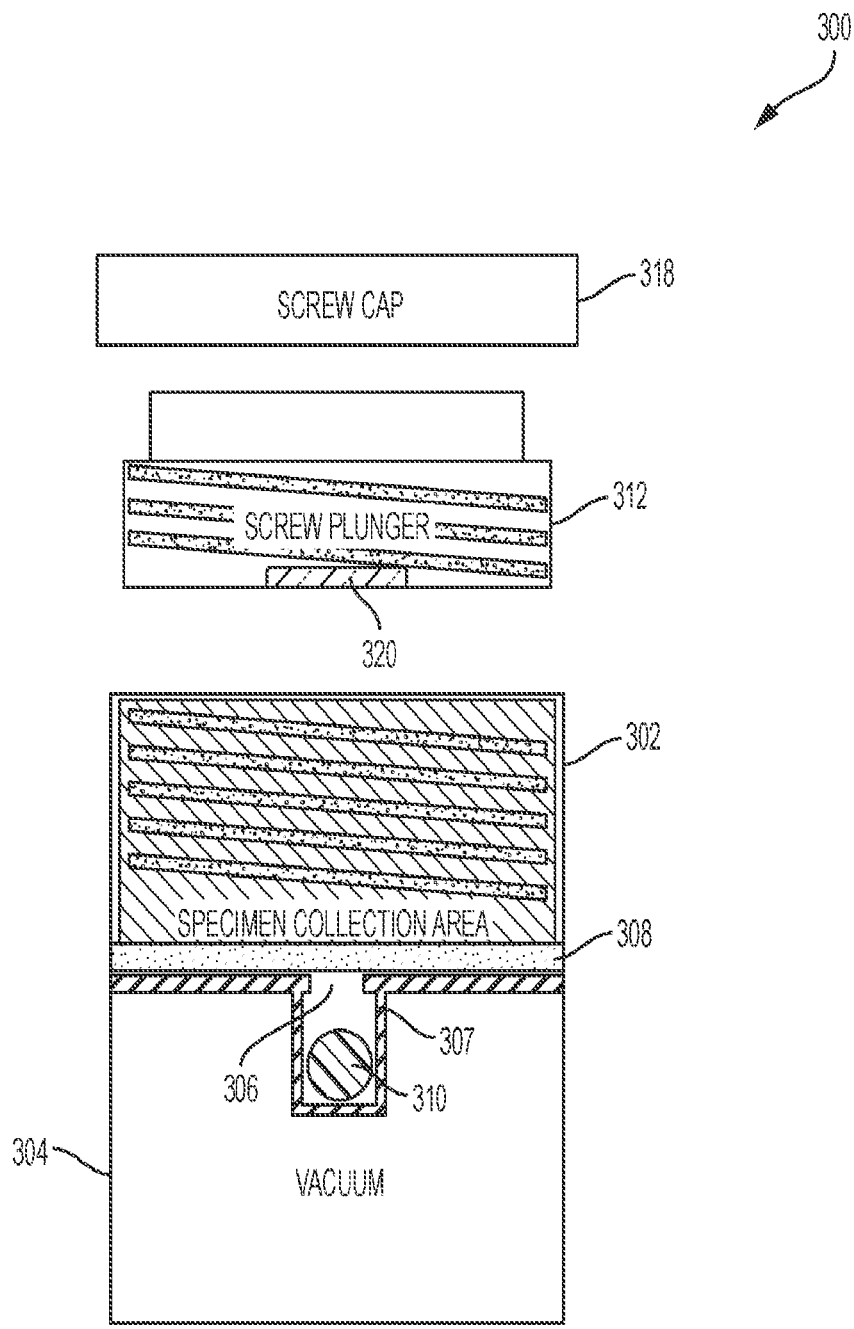
FIGS. 19A-19E depict an exemplary embodiment of a collection device (e.g., a "SecUrine" device, as termed herein) according to the invention in which a magnet is used to prevent the flow of cellular constituents through the membrane during transport or storage.
Figure 19B:
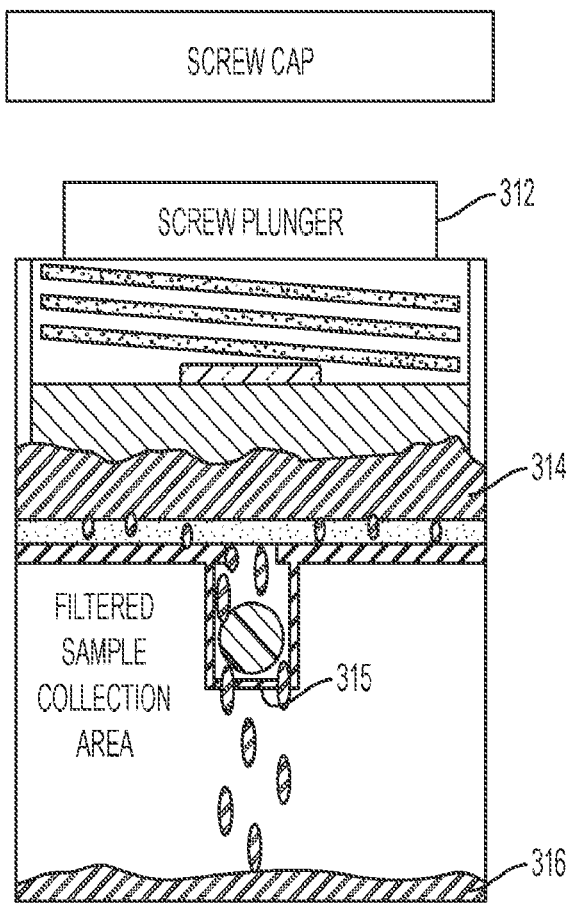
Figure 19C:
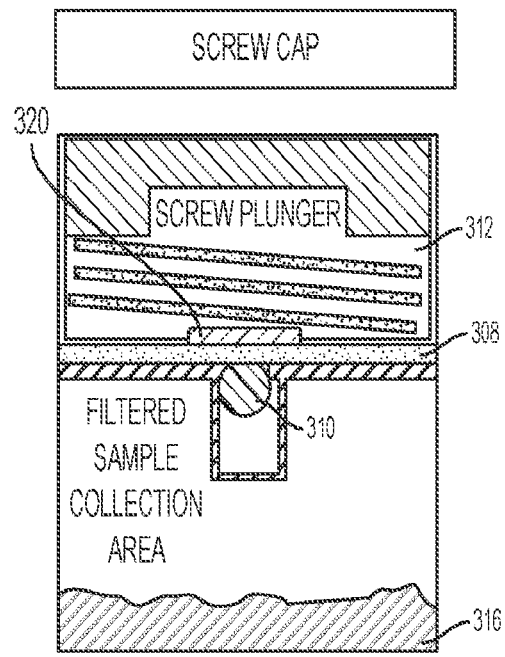
Figure 19D:
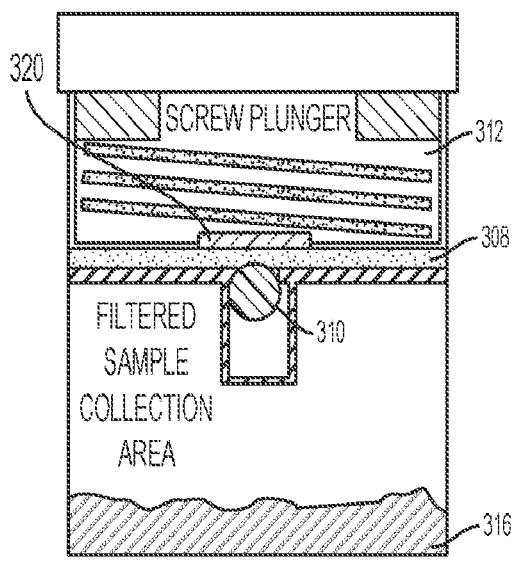
Figure 19E:
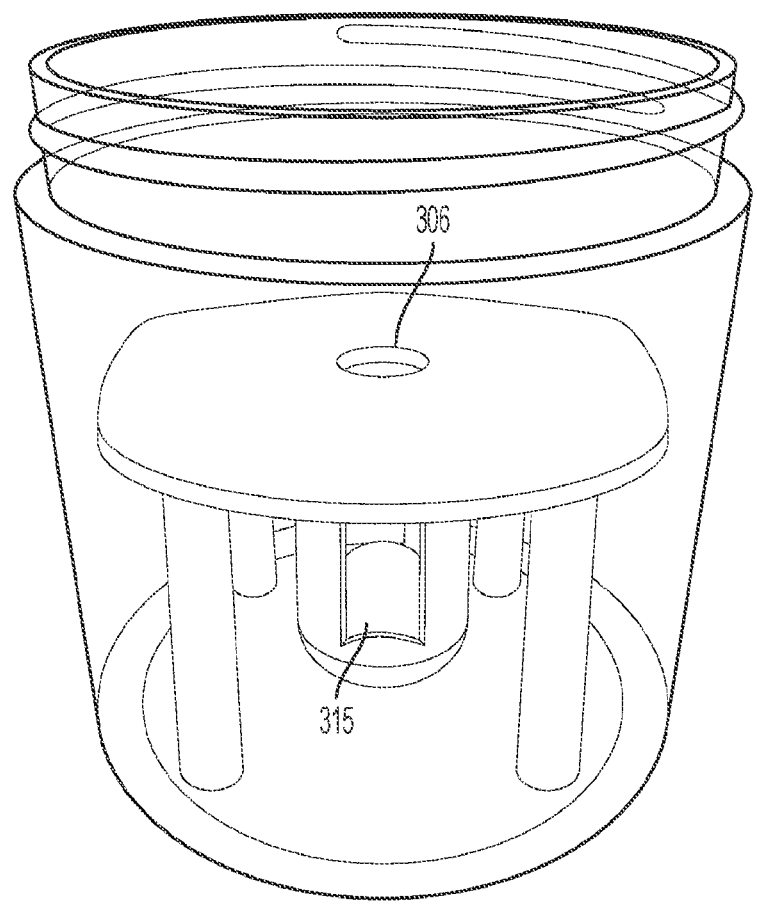
Figure 20A:
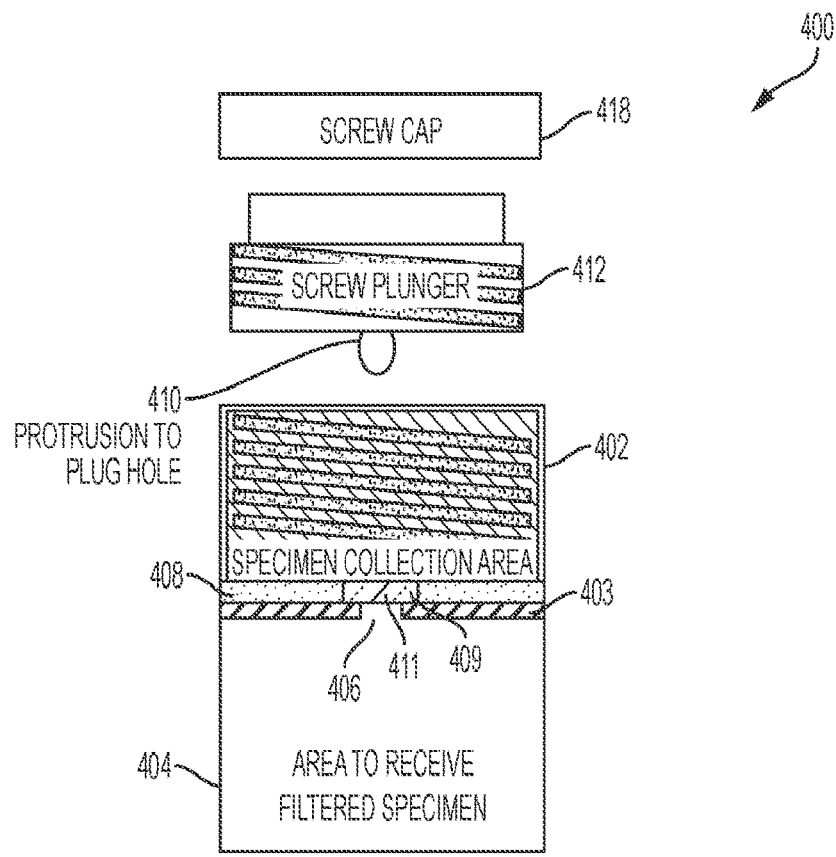
FIGS. 20A-20D show another exemplary embodiment of a collection device according to the invention.
Figure 20B:
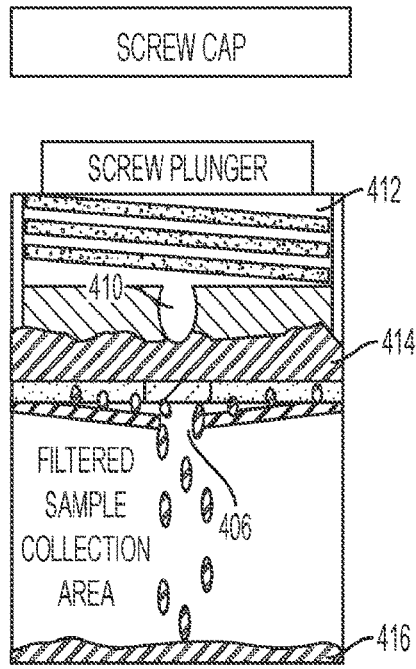
Figure 20C:
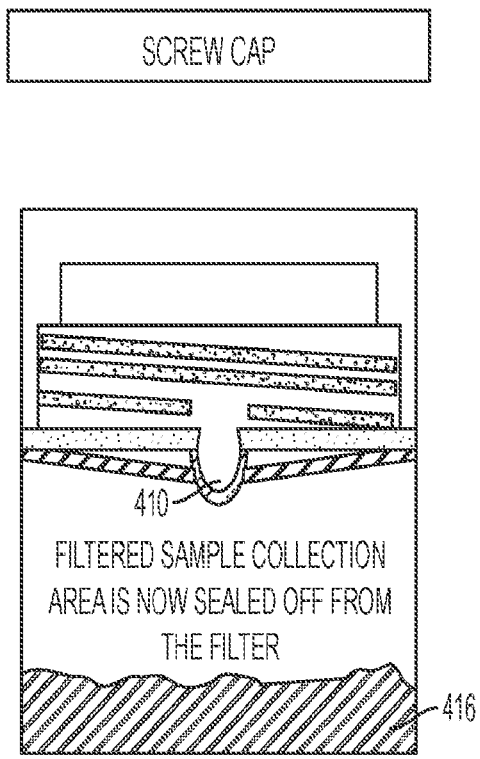
Figure 20D:
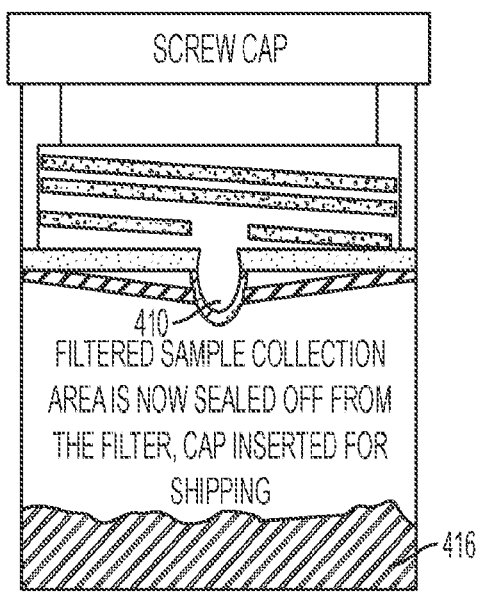

FIG. 17 shows the results of an experiment demonstrating that diatomaceous earth can stabilize extra-cellular vesicle protein markers in urine processed by collection device 100, even when subjected to storage for 48 hours and a freeze-thaw event. Depicted are an immunoblot (above) and a protein stain showing THP. Lane 1: extra-cellular vesicle markers from a prep of a sample taken immediately after donation. Lane 2: extra-cellular vesicle markers from a prep of the same sample depicted in Lane 1, but after 48 hours of storage and a freeze-thaw event. Clearly vesicle markers are degraded while THP is relatively stable. Lane 3: extra-cellular vesicle markers from a prep of the same sample depicted in Lane 1, but after 48 hours of storage and a freeze-thaw event with the inclusion of 100 ul slurry of 50% diatomaceous earth. Clearly the vesicle markers have not been degraded. In another exemplary embodiment, collection device 200 shown in FIGS. 18A-18C may include upper chamber 202 and lower chamber 204 in which lower chamber 204 is under vacuum. In this exemplary embodiment, the force supplied by the screw cap plunger of collection device 100 may be replaced with a force supplied by a vacuum within lower chamber 204, which is separated from upper chamber 202, in part, by membrane 216 positioned below filter (red) 208. The vacuum force may be released by puncturing membrane 216 (blue line) with a puncturing member 214 (such as, e.g., a tooth, a point, a spike, and the like; green) to produce opening 219 (FIG. 18B), Puncturing member 214 may be pushed into the vacuum membrane 216 by releasing a collar (yellow) 220 after the sample (purple) 212 is placed in the upper chamber 202, thereby releasing the vacuum in lower chamber 204, thereby forcing sample 212 through filter 208 and into lower chamber 204 via opening 219. As shown in FIG. 18 C, the filtered and collected sample 212 may be stored by screwing 218 onto the top side of upper chamber 202, thereby forcing puncturing member 214 to fully occlude opening 219.

In another exemplary embodiment, collection device 300 shown in FIGS. 19A-19E may include upper chamber 302 and lower chamber 304 separated by opening 306 positioned proximal to the upper end of ball housing 307. In this embodiment screw cap plunger 312 may be used to force sample 314 through filter 308. Ball housing 307 is configured to hold ball stop 310 below the filter 314 and to allow liquid to flow through opening 306 and around the ball stop 310 and out of ball housing 307 via one or more slots or opening 315. A magnet 320 may be positioned on the lower side of screw cap plunger 312 to arrest and/or prevent the flow of cellular constituents through the membrane during transport or storage. When the ball is up at the top, it stops up the hole near the filter and prevents flow. There is a rubber seal 317 positioned around the opening 306. As screw cap plunger 312 is lower, magnet 320 may be positioned within proximity to opening 306 and ball stop 310, thereby pulling ball stop 310 proximate to opening 306 and rubber seal 317 so that ball stop 310 fully occludes/seals opening 306. Ball stop 310 may be made of a variety of metal materials such as, for example, iron. Advantageously, ball stop 310 mediated sealing of opening 306 may prevent cells and other debris trapped in the filter that may break down over time and release tiny particles that may be able to get through the filter. The ferrous ball stop 310 plugs the hole between the filter and the filtered sample specimen 316, preventing these undesirable breakdown products from contaminating the filtered sample specimen 316. Once the process is complete, the patient simply screws on the screw cap 318, creating an additional seal for safety during shipping/storage.

FIG. 20 depicts an exemplary embodiment in which collection device 400 includes an upper chamber 402 and a lower chamber 404 separated by a rigid shelf 403 structure with an opening 406 in the middle that is positioned a few millimeters below the filter 408, which has a filter opening 409 that is position in the center of filter 408 and is aligned with opening 406 in the shelf 403 below and covered by a flexible membrane 411. The screw cap plunger 412 has a protrusion 410 that also aligns with both holes described above. Upon inserting screw cap plunger 412 into upper chamber 402 and rotating so the threads move the screw cap plunger 418 down, the urine sample 414 deposited previously in the collection chamber will be forced through the membrane 411—creating a cell free sample 416 in the lower chamber 404 below. Complete rotation of the screw cap plunger 412 into a fully lowered position will also result in the protrusion 410 pushing the flexible membrane 411 into the opening 406 in the shelf thereby blocking further contact between the filter and the cell-free sample. The collected sample may be capped with cap 418.

Figure 21A:
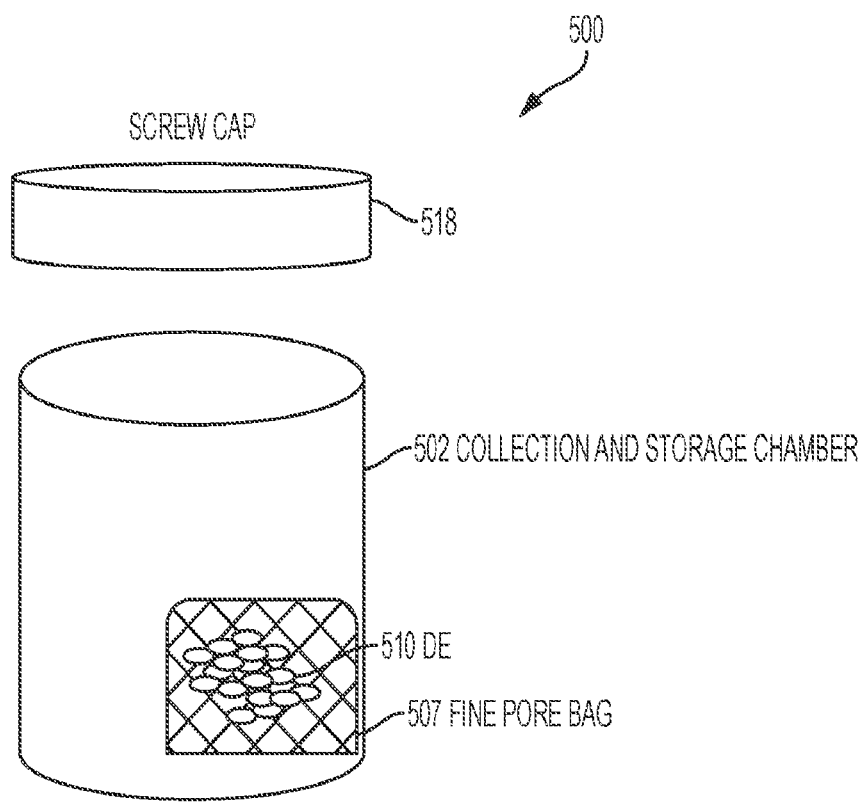
FIGS. 21A-21B show an exemplary embodiment of a collection device according to the present disclosure.
Figure 21B:
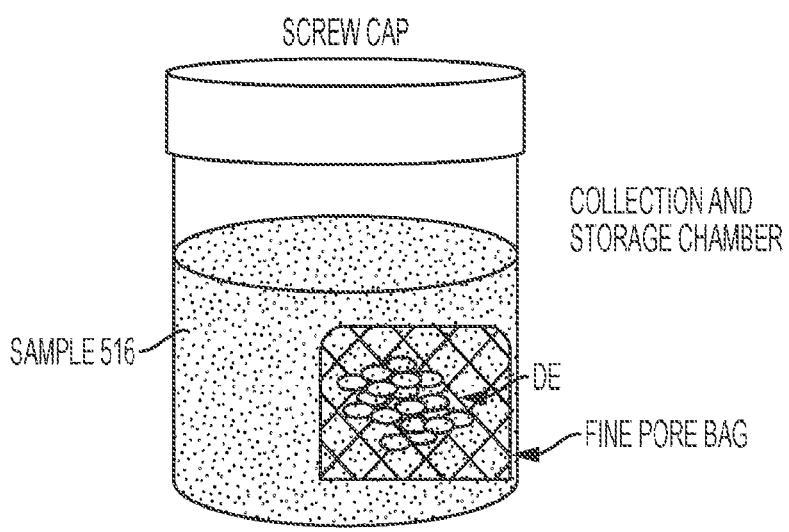

FIGS. 21A-B depict an exemplary embodiment of collection device 500 that includes a single collection chamber 502 for receiving a sample 516 (e.g., urine). The bioparticle stabilization matrix 510 (i.e. diatomaceous earth (DE)) is separated from any cells contained in the sample by a mesh bag 507 or similar structure with pore sizes that will exclude cells (<7 microns) but not exclude bioparticles (>0.1 microns). This embodiment is simpler and less expensive than previous embodiments although it does have the drawback of not removing the cells completely from the sample prior to storage/transport. Thus, cell lysis can occur and expose the stabilization matrix to cell byproducts. However this embodiment would be suitable for shorter-term storage/shipment.

Figure 22A:
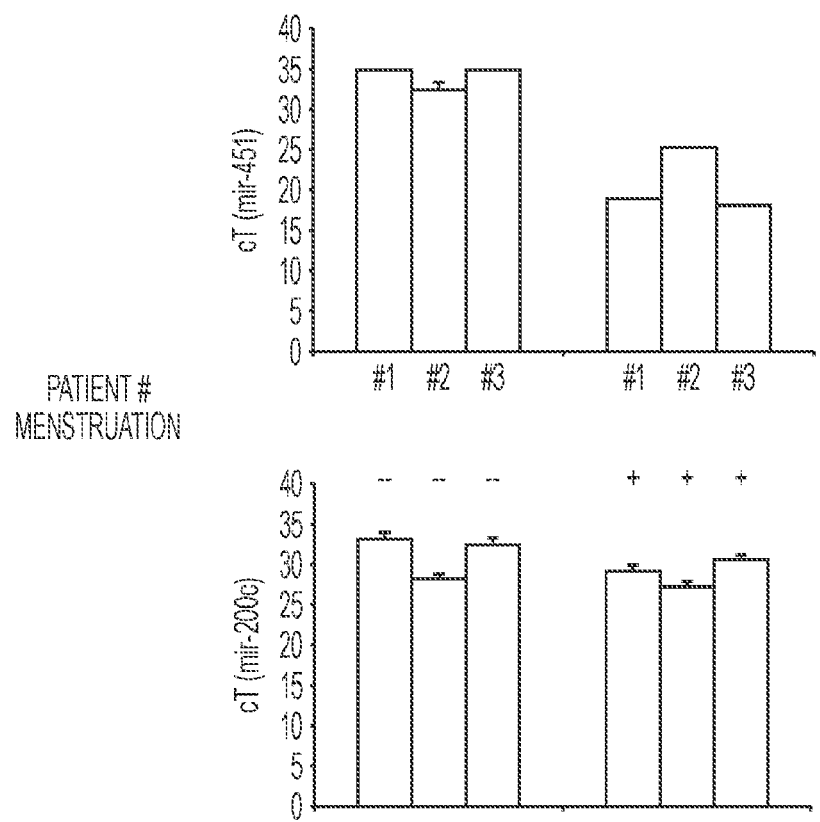
FIGS. 22A-22B demonstrate the need for the compositions and methods described herein by showing contamination of urine samples by blood miRNA (FIG. 22A) and blood protein (FIG. 22B, e.g. hemoglobin). 30 mls of urine from 3 healthy volunteers (#1, #2, #3) were taken during menstruation (+lanes) or 1 week after (−−lanes) and frozen at −80° C. The samples were thawed at 37° C. for 30 minutes and 5 mls were taken from each sample, spun in a centrifuge (1500×g) to remove cells, and extracellular vesicles were isolated by DE exposure (see PCT/US2015/043768). For FIG. 22A, the RNA was isolated from the DE column by Invitrogen's Mirvana miRNA isolation kit (AM1560) and probed by RT-PCR with probes specific for mir-451 (ThermoFisher). For FIG. 22B, the protein was isolated by Laemmli buffer and immunoblotted for Hemoglobin (representing Red Blood Cell (RBC) Contamination), Rab5 and CD9 (representing extracellular vesicles).
Figure 22B:
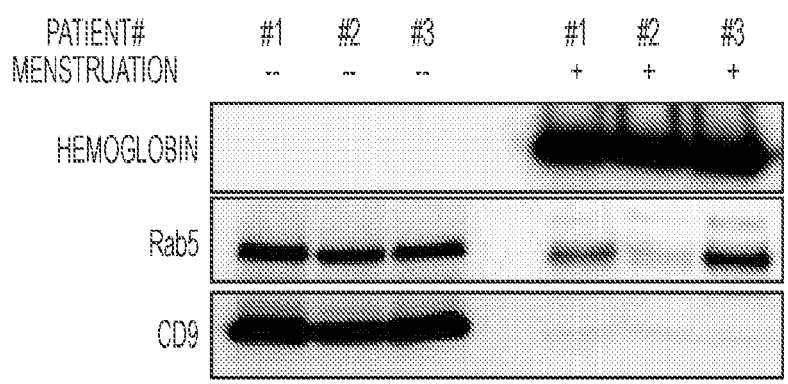
Figure 23:
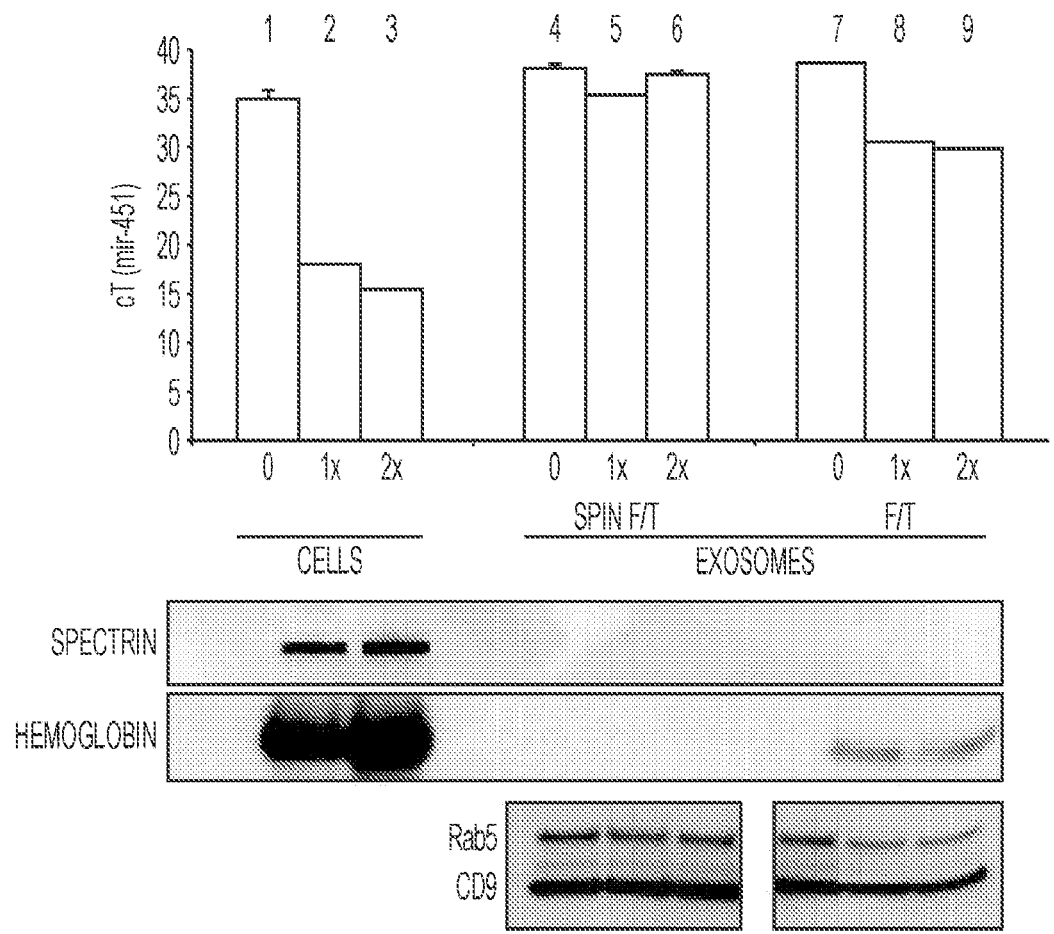
FIG. 23 validates a red blood cell contamination assay. Zero (0; lanes 1, 4, 7) or approximately 1 million (1×; lanes 2, 5, 8) and 2 million (2×; lanes 3, 6, 9) red blood cells were added to nine 5 ml aliquots of a healthy volunteer urine sample. The cells were immediately spun down in 6 samples (lanes 1-3 and lanes 4-6) and the pellets were assayed for mir451a (lanes 1-3 top) or the proteins spectrin (representing red blood cell membranes) or hemoglobin (representing red blood cellular protein). Lanes 1-3 represent total cellular input. The supernatant for the rest of the 6 samples, 3 samples without cells (lanes 4-6) and 3 samples still with cells (lanes 7-9) were frozen at −80° C. The next day the samples were thawed at 37° C. for 1 hour, spun at 1500×g for 5 minutes and extracellular RNA (top) and protein (bottom) was isolated from the supernatants by DE (see e.g., PCT/US2015/043768). Lanes 7-9 (top) show that the presence of increasing amounts of RBCs in the samples with cells that were frozen leads to significant and dose dependent contamination of mir451a (top) and hemoglobin (bottom). Also, the yield of EV marker proteins CD9 and Rab5b was significantly decreased in the presence of frozen cells lanes (7-9 bottom). However, removing the spiked in cells by centrifugation prior to freezing (lanes 4-6) completely removes the contaminating red blood cell components. The amounts of the proteins were determined by immunoblot with the appropriate antibodies. The amount of mir451a was determined by RT-PCR with primers specific for mir451a (ThermoFisher).
Figure 24:
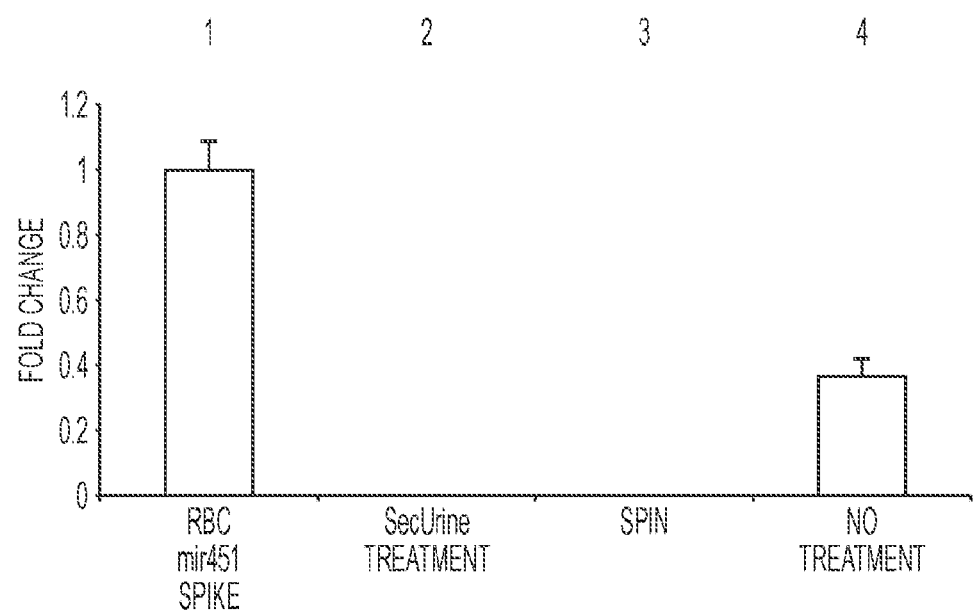
FIG. 24 shows that an exemplary embodiment of a collection device (e.g., "SecUrine" device) as described in FIG. 19 eliminates mir451a contamination (lane 4) from a 5 ml spiked frozen and thawed sample (lane 2) as well as a five minute 1500×g centrifugation step (lane 3) in the RBC spike assay described in FIG. 23. This experiment was performed as per FIG. 23. Lane 1 represents the amount of mir451a that was contained in 1,000,000 Red Blood Cells spiked into a 5 ml sample. Lane 4 represents the amount of this contamination released from cells upon freezing at −80 degrees C. for 24 hours. This contamination can be removed by centrifugation (lane 3) or just as well by the "SecUrine" device without the need of power or equipment of any kind.

Example 5: The Presence of and Removal of Contaminating Cellular Protein and RNA in Frozen Urine Samples FIG. 22 shows that frozen urine samples from female donors undergoing menstruation are significantly contaminated with red blood cell RNA (mir451, FIG. 22A) and red blood cell (RBC) protein (hemoglobin; FIG. 22B) while urine samples from the same donors between menstruation are not contaminated. Thus, a high percentage of natural, healthy, samples may be contaminated with cellular biomolecules if the cells are not removed immediately upon donation. Since it is well known that urine from patients suffering from a variety of diseases that affect the kidney (i.e. Diabetic Nephropathy, Lupus Nephropathy, pre-eclampsia, HIV, polycystic kidney disease, acute kidney injury, chronic kidney disease, kidney transplant rejection, and glomerulonephritis) can be contaminated by blood cells, this issue may significantly complicate biomarker discovery and screening for many clinical projects. To further study and solve this issue an assay to recreate cellular contamination was devised. FIG. 23 shows that the addition of 1,000,000 (lane 2) RBCs or 2,000,000 RBCs (lane 3) to healthy volunteer urine samples leads to significant contamination of hemoglobin and mir-451 in samples that are frozen prior to cell removal and extracellular vesicle isolation (lanes 8 and 9). However, if cells are removed prior to freezing by centrifugation there is no contamination (lanes 5 and 6). Also, cellular contamination leads to suboptimal extracellular marker isolation (Rab5 and CD9) (compare levels in lanes 5-6 and lanes 8-9). Because it is not possible for patients to centrifuge their samples at home, the devices and methods described herein (e.g., the "SecUrine" device) enable the removal of cells from urine samples in this setting. FIG. 24 shows that a "SecUrine" device removed cellular contamination that had been spiked into urine samples in a manner that was as effective as centrifugation (compare lane 2 ("SecUrine") and lane 3 (centrifugation) with lane 4).

All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to carry out the objects and obtain the ends and advantages mentioned, as well as those inherent therein. The methods and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications can be made to the invention disclosed herein without departing from the scope and spirit of the invention. Thus, such additional embodiments are within the scope of the present invention and the following claims.

The invention illustratively described herein suitably can be practiced in the absence of any element or elements, limitation or limitations that are not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and there is no intention that in the use of such terms and expressions of excluding any equivalents of the features shown and described or portions thereof but it is recognized that various modifications are possible within the scope of the invention claimed. Thus, it should be understood that although the present invention has been specifically disclosed by preferred embodiments, optional features, modification and variation of the concepts herein disclosed may be resorted to by those skilled in the art, and that such modifications and variations are considered to be within the scope of this invention as defined by the description and the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those embodiments may become apparent to those of ordinary skill in the art upon reading the foregoing description.

The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Those skilled in the art will recognize, or be able to ascertain using no more than routine experimentation, many equivalents to the specific embodiments of the invention described herein. Such equivalents are intended to be encompassed by the following claims.

We claim:

1. A composition for contacting a bioparticle-containing biofluid of an organism comprising:
   a container or device comprising an upper chamber having a first end and a second end; a lower chamber having a top end and a bottom end, wherein the lower chamber contains siliceous porous beads possessing a pore size capable of sequestering the bioparticle of the bioparticle-containing biofluid upon contact with the bioparticle-containing biofluid; and a filter housing having a filter, wherein the second end of the upper chamber includes an opening configured to allow fluid communication between the upper chamber and the lower chamber through the filter in the filter housing.

2. The composition of claim 1, wherein the bioparticle of the bioparticle-containing biofluid is an exosome.

3. The composition of claim 1, wherein the bioparticle of the bioparticle-containing biofluid is a protein-nucleic acid complex.

4. The composition of claim 1, wherein the bioparticle of the bioparticle-containing biofluid promotes a disease or disorder.

5. The composition of claim 4, wherein the disease or disorder is a cancer.

6. The composition of claim 1, wherein the siliceous beads comprise diatomaceous earth (DE).

7. The composition of claim 1, wherein the bioparticle of the bioparticle-containing biofluid is an AGO2-miRNA particle.

8. The composition of claim 4, wherein the disease or disorder is a bladder cancer or an oral cancer.

9. The composition of claim 1, wherein the bioparticle-containing biofluid is urine.

10. A method
    reducing the level of a bioparticle in a bioparticle-containing biofluid of an organism, the method comprising:
       contacting the bioparticle-containing biofluid of the organism with the composition of claim 1,
       thereby reducing the level of the bioparticle in the bioparticle-containing biofluid of the organism.

11. The method of claim 10, wherein the bioparticle of the bioparticle-containing biofluid is an exosome.

12. The method of claim 11, wherein reduction of the level of exosomes in the bioparticle-containing biofluid is confirmed by determining whether or not sequestered material is enriched for protein and/or nucleic acid markers that are known to preferentially segregate with exosomes.

13. The method of claim 10, wherein reduction in protein and/or nucleic acid markers of the bioparticle within the bioparticle-containing biofluid after contact with the composition of claim 1, relative to an appropriate control, indicates sequestration or reduction of the bioparticles in the bioparticle-containing biofluid.

14. The method of claim 10, wherein the bioparticle of the bioparticle-containing biofluid is an AGO2-miRNA particle.

15. The method of claim 14, wherein reduction of the level of the AGO2-miRNA particle in the bioparticle-containing biofluid is confirmed by assaying for specific miRNAs known to take part in an AGO2-miRNA particle or by assaying for AGO2 protein.

16. The method of claim 10, wherein the bioparticle of the bioparticle-containing biofluid is a cell-free nucleic acid particle.

17. The method of claim 10, wherein the fluid communication between the upper chamber and the lower chamber through the filter removes cells and/or debris from the bioparticle-containing biofluid.

* * * * *